(12) United States Patent
Tidwell

(10) Patent No.: US 9,467,150 B2
(45) Date of Patent: Oct. 11, 2016

(54) DYNAMIC CLOCK RATE CONTROL FOR POWER REDUCTION

(71) Applicant: SanDisk Technologies Inc., Plano, TX (US)

(72) Inventor: Reed P. Tidwell, Centerville, UT (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/635,584

(22) Filed: Mar. 2, 2015

(65) Prior Publication Data

US 2016/0261274 A1 Sep. 8, 2016

(51) Int. Cl.
*G06F 1/00* (2006.01)
*H03L 7/00* (2006.01)

(52) U.S. Cl.
CPC ........................... *H03L 7/00* (2013.01)

(58) Field of Classification Search
USPC ............................ 713/322–330; 345/530–574
See application file for complete search history.

(56) References Cited

U.S. PATENT DOCUMENTS

| | | | |
|---|---|---|---|
| 5,777,942 A * | 7/1998 | Dosaka ................. | G11C 11/005 365/189.05 |
| 6,172,964 B1 | 1/2001 | Whitton | |
| 6,260,128 B1 | 7/2001 | Ohshima et al. | |
| 6,980,552 B1 | 12/2005 | Belz et al. | |
| 7,243,217 B1 | 7/2007 | Oliver et al. | |
| 8,468,404 B1 | 6/2013 | Chickermane et al. | |
| 8,775,856 B1 | 7/2014 | An et al. | |
| 2001/0014924 A1 | 8/2001 | Nishihara et al. | |
| 2002/0169990 A1 | 11/2002 | Sherburne | |
| 2002/0175839 A1 | 11/2002 | Frey | |
| 2003/0131271 A1 | 7/2003 | Chen et al. | |
| 2004/0044915 A1 | 3/2004 | Bose et al. | |
| 2005/0066213 A1 | 3/2005 | Vorbach et al. | |
| 2006/0288249 A1 | 12/2006 | Knepper et al. | |
| 2008/0106446 A1 | 5/2008 | Lee | |
| 2012/0098583 A1 | 4/2012 | Shibayama | |
| 2012/0166845 A1* | 6/2012 | Henry ................... | G06F 1/3206 713/323 |
| 2013/0082748 A1 | 4/2013 | Karalar | |
| 2014/0139276 A1* | 5/2014 | Daily ...................... | H03K 5/00 327/153 |
| 2014/0192939 A1 | 7/2014 | Smart et al. | |
| 2014/0351526 A1 | 11/2014 | Peterson | |
| 2015/0066854 A1* | 3/2015 | Yokoi ................. | G06F 17/3028 707/634 |
| 2015/0091620 A1 | 4/2015 | Pollock | |
| 2015/0092074 A1* | 4/2015 | Ikeda ..................... | H04N 5/232 348/222.1 |

OTHER PUBLICATIONS

Charlie Demerjian, "What is AMD's PowerTune 2.0 and what does it do? AMD GPU 14: Ignorance doesn't stop the internet 'debate'", SemiAccurate, On Target Technology News, Dec. 16, 2013, 12 pages.

* cited by examiner

*Primary Examiner* — Brandon S Cole

(74) *Attorney, Agent, or Firm* — Brinks Gilson & Lione

(57) ABSTRACT

A pipeline system may adjust clock rates of variable-rate clock signals sent to different processing circuit blocks in a pipeline based on their respective, individual input and output buffer fill levels and processor busy statuses. Variable-rate clock generation circuitry may generate the variable-rate clock signals based on a common clock signal. Additionally, the variable-rate clock generation circuitry may set or adjust the rates of variable-rate clock signals linearly in evenly-spaced increments and decrements.

25 Claims, 16 Drawing Sheets

Y=3
N=10
fraction=7/10

| Clock Cycle | 1st Acc. Input | 2nd Acc. Input | X≥10? | MUX Output |
|---|---|---|---|---|
| 1 | 3 | 0 | N | 3 |
| 2 | 3 | 3 | N | 6 |
| 3 | 3 | 6 | N | 9 |
| 4 | 3 | 9 | Y | 2 |
| 5 | 3 | 2 | N | 5 |
| 6 | 3 | 5 | N | 8 |
| 7 | 3 | 8 | Y | 1 |
| 8 | 3 | 1 | N | 4 |
| 9 | 3 | 4 | N | 10 |
| 10 | 3 | 10 | Y | 0 |
| 11 | 3 | 0 | N | 3 |

| Clock | de-rating value, Y | fraction (M/N) | Waveform |
|---|---|---|---|
| Fixed-Rate Clock | | | |
| Variable-Rate Clock | 0 | 10/10 | |
| | 1 | 9/10 | |
| | 2 | 8/10 | |
| | 3 | 7/10 | |
| | 4 | 6/10 | |
| | 5 | 5/10 | |
| | 6 | 4/10 | |
| | 7 | 3/10 | |
| | 8 | 2/10 | |
| | 9 | 1/10 | |
| | 10 | 0/10 | |

Y=3
N=8
fraction=5/8

| Clock Cycle | 1st Acc. Input | 2nd Acc. Input | X≥1000 (8)? | MSB Output | (n-1)-bit Output |
|---|---|---|---|---|---|
| 1 | 0011 (3) | 000 (0) | N | 0 | 011 (3) |
| 2 | 0011 (3) | 011 (3) | N | 0 | 110 (6) |
| 3 | 0011 (3) | 110 (6) | Y | 1 | 001 (1) |
| 4 | 0011 (3) | 001 (1) | N | 0 | 100 (4) |
| 5 | 0011 (3) | 100 (4) | N | 0 | 111 (7) |
| 6 | 0011 (3) | 111 (7) | Y | 1 | 010 (2) |
| 7 | 0011 (3) | 010 (2) | N | 0 | 101 (5) |
| 8 | 0011 (3) | 101 (5) | Y | 1 | 000 (0) |
| 9 | 0011 (3) | 000 (0) | N | 0 | 011 (3) |

| Clock | de-rating value, Y | fraction (M/N) | Waveform |
|---|---|---|---|
| Fixed-Rate Clock | | | |
| Variable-Rate Clock | 0 | 8/8 | |
| | 1 | 7/8 | |
| | 2 | 6/8 | |
| | 3 | 5/8 | |
| | 4 | 4/8 | |
| | 5 | 3/8 | |
| | 6 | 2/8 | |
| | 7 | 1/8 | |
| | 8 | 0/8 | |

| Condition | Fill level of Input FIFO Buffer | Busy Status of Processor | Fill level of Output FIFO Buffer | Rate for Variable-rate clock signal PERFORMANCE | Rate for Variable-rate clock signal REDUCED-POWER |
|---|---|---|---|---|---|
| 1 | empty | busy | empty | maximum | scaled-down |
| 2 | empty | busy | not empty, below target | maximum | scaled-down |
| 3 | empty | busy | not empty, above target | scaled-down | scaled-down |
| 4 | empty | idle | empty | idle | idle |
| 5 | empty | idle | not empty, below target | idle | idle |
| 6 | empty | idle | not empty, above target | idle | idle |
| 7 | not empty, below target | busy | empty | maximum | scaled-down |
| 8 | not empty, below target | busy | not empty, below target | maximum | scaled-down |
| 9 | not empty, below target | busy | not empty, above target | scaled-down | scaled-down |
| 10 | not empty, above target | busy | empty | maximum | maximum |
| 11 | not empty, above target | busy | not empty, below target | maximum | maximum |
| 12 | not empty, above target | busy | not empty, above target | scaled-down | scaled-down |

FIG. 12

Y=5
N=8
fraction=5/16

| Clock Cycle | De-rating Value | n LSBs | Accum. Output | MSB Output (Var_Clk) | Transition | Pulses |
|---|---|---|---|---|---|---|
| 1 | 0101 (5) | 0000 | 0101 | 0 | - | |
| 2 | 0101 (5) | 0101 | 1010 | 1 | low-to-high | |
| 3 | 0101 (5) | 1010 | 1111 | 1 | - | |
| 4 | 0101 (5) | 1111 | 0100 | 0 | high-to-low | Pulse 1 |
| 5 | 0101 (5) | 0100 | 1001 | 1 | low-to-high | |
| 6 | 0101 (5) | 1001 | 1110 | 1 | - | |
| 7 | 0101 (5) | 1110 | 0011 | 0 | high-to-low | Pulse 2 |
| 8 | 0101 (5) | 0011 | 1000 | 1 | low-to-high | |
| 9 | 0101 (5) | 1000 | 1101 | 1 | - | |
| 10 | 0101 (5) | 1101 | 0010 | 0 | high-to-low | Pulse 3 |
| 11 | 0101 (5) | 0010 | 0111 | 0 | - | |
| 12 | 0101 (5) | 0111 | 1100 | 1 | low-to-high | |
| 13 | 0101 (5) | 1100 | 0001 | 0 | high-to-low | Pulse 4 |
| 14 | 0101 (5) | 0001 | 0110 | 0 | - | |
| 15 | 0101 (5) | 0110 | 1011 | 1 | low-to-high | |
| 16 | 0101 (5) | 1011 | 0000 | 0 | high-to-low | Pulse 5 |

| Clock | de-rating value, Y | fraction (M/N) | Waveform |
|---|---|---|---|
| Fixed-Rate Clock | | | |
| Variable-Rate Clock | 8 | 8/16 | |
| | 7 | 7/16 | |
| | 6 | 6/16 | |
| | 5 | 5/16 | |
| | 4 | 4/16 | |
| | 3 | 3/16 | |
| | 2 | 2/16 | |
| | 1 | 1/16 | |
| | 0 | 0/16 | |

FIG. 18

DYNAMIC CLOCK RATE CONTROL FOR POWER REDUCTION

BACKGROUND

Pipelining is a technique used in chip design that allows data propagation through processing stages or blocks. In general, processing blocks in a pipeline operate on clock pulses to communicate data between the blocks. However, clocking in and of itself consumes power. As a consequence, processing blocks in a pipeline waste power when clock pulses occur but the processing blocks do not process data on those clock pulses. On the other hand, decreasing clock rates increases the latency and limits maximum performance.

During operation of a pipeline, some blocks may be more loaded than others. For example, an error correction processing block in a pipeline may become more heavily loaded if the numbers of errors it has to correct is very high, while other blocks in the pipeline do not have as much work to do. If the clock rate remains fixed for these less heavily-loaded blocks, clock pulses may be wasted, resulting in the processing blocks needlessly consuming power.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIG. 12 is a chart indicating different rates for a variable-rate clock signal associated with different combinations of buffer fill levels, process busy statuses, and modes of operation.

FIG. 18 is a chart illustrating resulting fractions and waveforms corresponding to various possible de-rating values for a denominator value of sixteen associated with the variable-rate clock generation circuit of FIG. 16.

DETAILED DESCRIPTION OF THE PRESENTLY PREFERRED EMBODIMENTS

Overview

Figure 1:
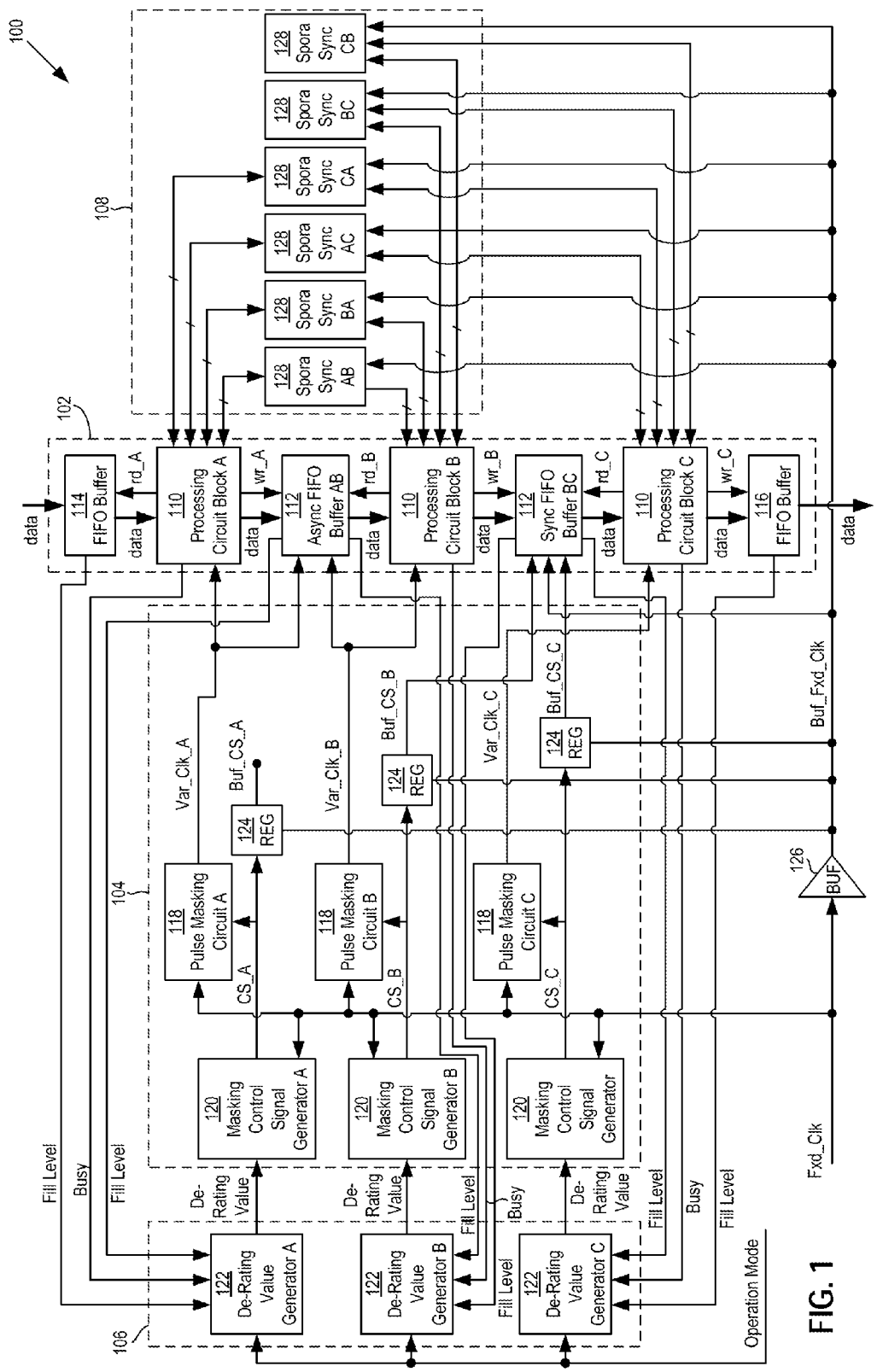
FIG. 1 is a block diagram of an example pipeline system.

By way of introduction, the below embodiments relate to an electronic pipeline system and method for generation of clock signals that are sent to processing circuit blocks of the pipeline system. In one embodiment, an electronic pipeline system may include a pipeline, a synchronizer circuit, and clock generation circuitry. The pipeline may include a plurality of processing circuit blocks configured to process first data and communicate the processed first data in a main data flow of the pipeline. Additionally, a first processing circuit block may be configured to communicate second data to a second processing circuit block outside of the main data flow. The second data may include a current data set that the first processing circuit block presents to the synchronizer circuit and a next data set that the first processing circuit block presents to the synchronizer circuit after presenting the current data set. The synchronizer circuit may be configured to enable the communication of the second data from the first processing circuit block to the second processing circuit block. The clock generation circuitry may be configured to generate a first control signal to mask first pulses of a common clock signal to generate a first masked clock signal for operation of the first processing circuit block, generate a second control signal to mask second pulses of the common clock signal to generate a second masked clock signal for operation of the second processing circuit block, and send the first control signal and the second control signal to the synchronizer circuit. The synchronizer circuit may include a control module that is configured to receive the first control signal and the second control signal, and enable the communication of the second data between the first processing circuit block and the second processing circuit block in response to receipt of the first control signal and the second control signal.

In another embodiment, a method of communicating data outside a main data flow of a pipeline from a first processing circuit block to a second processing circuit block may be performed. The method may include: presenting, with a synchronizer circuit, a current data set of the data to the second processing circuit block; receiving, with the synchronizer circuit, a first control signal transitioning between a high level and a low level according to a first masking rate at which first pulses of a common clock signal are masked to generate a first masked clock signal that is sent to a first processing circuit block of the pipeline; and receiving, with the synchronizer circuit, a second control signal transitioning between the high level and the low level according to a second masking rate at which second pulses of the common clock signal are masked to generate a second masked clock signal that is sent to a second processing circuit block of the pipeline. The method may further include sending, with the synchronizer circuit, a receive valid signal to the second processing circuit block to notify the second processing circuit block to retain the current data set that the synchronizer circuit is presenting based on the first control signal.

In yet another embodiment, a synchronizer circuit may be configured to enable communication of data outside of a main data flow of a pipeline between a first processing circuit block and a second processing circuit block of the pipeline. The synchronizer circuit may include a multiplexer and a control module. The multiplexer may be configured to present a current data set of the data to the second processing circuit before presenting a next data set to the second processing circuit block. The control module may be configured to receive a first control signal that transitions between a high level and a low level according to a first masking rate at which first pulses of a common clock signal are masked for generation of a first masked clock signal that is sent to the first processing circuit block. The control module may also be configured to receive a second control signal that transitions between the high level and the low level according to a second masking rate at which second pulses of the common clock signal are masked for generation of a second masked clock signal that is sent to the second processing circuit block. Further, the control module may be configured to send a receive valid signal to the second processing circuit block to notify the second processing circuit block to retain the current data set that the multiplexer is presenting based on the first control signal.

In some embodiments, the control module may receive the common clock signal and detect a pulse of the common clock signal corresponding to when the first processing circuit block is to begin presenting the next data set based on the first control signal.

In some embodiments, a register may store the current data set when the first processing circuit block begins presenting the next data set.

In some embodiments, when the first processing circuit block begins presenting the next data set, the control module may configure the multiplexer to present the next data set to the second processing circuit block instead of the current data set stored in the register if the second processing circuit block has retained the current data set; and configure to multiplexer to present the current data set stored in the register instead of the next data set that the first processing circuit block is presenting if the second processing circuit block has not retained the current data set.

In some embodiments, the control module may detect whether the second processing circuit retained a prior data set that the first processing circuit block presented prior to presenting the current data set; and send a send ready signal to the first processing circuit block to indicate that the first processing circuit block can present the next data set upon detection of the second processing circuit block having retaining the prior data set.

Other embodiments are possible, and each of the embodiments can be used alone or together in combination. Accordingly, various embodiments will now be described with reference to the attached drawings.

Exemplary Embodiments

Various modifications to and equivalents of the embodiments described and shown are possible and various generic principles defined herein may be applied to these and other embodiments. Thus, the claimed invention is to be accorded the widest scope consistent with the principles, features, and teachings disclosed herein.

The present description describes pipeline systems that set and adjust clock rates for processing circuit blocks in a pipeline based on input and output buffer fill levels, processor busy statuses, and/or an operation mode. In addition, the present description processing circuit blocks in a pipeline that operate in different clock domains, where clock signals for the different clock domains are generated based on a same or common clock signal. The present description further describes pipeline systems that communicate data or other information outside of a main data flow of a pipeline using sporachronous synchronizers. The present description also describes various variable-rate clock generators that adjust rates of variable-rate clock signals linearly in evenly-spaced increments and decrements.

FIG. 1 shows a block diagram of an example electronic pipeline system 100 that includes an electronic pipeline 102, variable-rate clock generation circuitry 104, de-rating value generation circuitry 106, and sporachronous synchronizer circuitry 108. The variable-rate clock generation circuitry 104 may be configured to generate variable-rate clock signals for processing circuit blocks 110 of the pipeline 102 based on the processing loads and/or capacities of the processing circuit blocks 110. The de-rating value generation circuitry 106 may be configured to generate de-rating values for the variable-rate clock generation circuitry 104 to use to generate the variable-rate clock signals. The sporachronous synchronizer circuitry may be used to communicate signals, such as data and control signals, that are outside the main data flow of the pipeline 102 between processing circuit blocks 110.

FIG. 1 shows three processing circuit blocks 110, including processing circuit block A, processing circuit block B, and processing circuit block C. The three processing circuit blocks 110 may be a complete pipeline or may be representative of only a portion of a larger pipeline. The processing circuit blocks 110 may be configured to communicate data in a designated flow of the pipeline 102 from block to block in a single direction. Each processing circuit block 110 may be configured to perform a specific function or process of an overall function, operation, purpose, or objective of the pipeline 102. As non-limiting examples, the pipeline 102 may be configured to perform a read operation or a write operation for a non-volatile memory system, and each of the processing circuit blocks 110 may be configured to perform a respective process or function associated with the read operation or the write operation. Types of functions that the processing circuit blocks 110 may perform include logic functions, Boolean functions, and/or arithmetic functions, as examples. Other types of functions may be possible. Each of the processing circuit blocks 110 may be implemented in hardware or a combination of hardware and software to perform their respective functions.

In addition, each of the processing circuit blocks 110 may be one or both of an upstream processing circuit block and a downstream processing circuit block from the perspective of the other processing circuit blocks. From the perspective of a particular processing circuit block, upstream processing circuit blocks may be those processing circuit blocks that process the data in the pipeline before the particular processing circuit block receives the data. Downstream processing circuit blocks may be those processing circuit blocks that process the data after the particular processing circuit block processes the data and/or may be a processing circuit block toward which the particular processing circuit block sends the data after it is done processing it. To illustrate, in FIG. 1, processing circuit blocks B and C are downstream to processing circuit block A, processing circuit blocks A and B are upstream to processing circuit block C, processing circuit block A is upstream to processing circuit block B, and processing circuit block C is downstream to processing circuit block B. For simplicity, and unless otherwise specified, an upstream processing circuit block may be a block that is directly or immediately upstream to a particular processing circuit block. Likewise, a downstream processing circuit block may be a block that is directly or immediately downstream to a particular processing circuit block.

Each of the processing circuit blocks 110 in the pipeline 102 may be separated by a buffer 112, such as a first-in, first-out (FIFO) buffer 112. As shown in FIG. 1, FIFO buffer AB is configured in between processing circuit blocks A and B, and FIFO buffer BC is configured in between processing circuit blocks B and C. FIFO buffers AB and BC configured in between the processing circuit blocks 110 may be both an output FIFO buffer for one of the processing circuit blocks 110 and an input FIFO buffer for another of the processing circuit blocks 110. In FIG. 1, FIFO buffer AB is an output FIFO buffer for processing circuit block A and an input FIFO buffer for processing circuit block B. Similarly, FIFO buffer BC is an output FIFO buffer for processing block B and an output FIFO buffer for processing block C.

From the perspective of the FIFO buffers, a processing circuit block 110 that sends data to an output FIFO buffer after it processes the data may be a sender or upstream processing circuit block 110 for that FIFO buffer. Additionally, a processing circuit block 110 that retrieves data from an input FIFO buffer in order to process the data may be a receiver or downstream processing circuit block 110 for that FIFO buffer.

After a particular processing circuit block is finished processing data, it sends the data to its output FIFO buffer for temporary storage. The particular processing circuit block may do so without concern as to whether the downstream processing circuit block is ready to receive and process the data. Subsequently, when the downstream processing circuit block is ready to process the data, the downstream processing circuit block may retrieve the data from its input FIFO buffer. So, for example in FIG. 1, when processing circuit block A is finished processing data, processing circuit block A may send the processed data to its output FIFO buffer, which is FIFO buffer AB. When processing circuit block B is ready to process the data, processing circuit block B may retrieve the data from its input buffer, which is also FIFO buffer AB.

In further detail, when a sender processing circuit block 110 wants its output FIFO buffer 112 to store data, it may assert a write signal "wr" being sent to the output FIFO buffer 112 at a first level, and when the sender processing circuit block 110 does not want its output FIFO buffer 112 to store data, it may assert the write signal "wr" at a second level. Accordingly, a FIFO buffer 112 may store received data upon detecting the write signal "wr" at the first level, and may ignore any data being received upon detecting the write signal "wr" at the second level.

Similarly, when a receiver processing block 110 wants to retrieve data from its input FIFO buffer, it may assert a read signal "rd" it sends to its input FIFO buffer 112 at a first level, and when the receiver processing circuit block 110 does not wants to retrieve data from inputs input FIFO buffer 112, it may assert the read signal "rd" at a second level. Accordingly, a FIFO buffer 112 may send the data it is storing to its receiver processing circuit block 110 when detecting the read signal "rd" at the first level, and may not send the data it is storing to the receiver processing circuit block 110 when detecting the read signal "rd" at the second level.

For completion, FIG. 1 also shows the input and output ends of the pipeline 102 as including an input buffer 114 for processing circuit block A and an output buffer 116 for processing circuit block C, which may operate in the same way as the FIFO buffers 112 configured in between the processing circuit blocks 112.

The rate or frequency at which the processing circuit blocks 110 may each send, receive, and process data may be determined by a clock signal and the rate or frequency at which the clock signal is oscillating or transitioning between high and low levels. The faster the clock rate, the faster a processing block receiving the clock signal may process the data. Similarly, the slower the clock rate, the slower a processor block receiving the clock signal may process the data. The variable-rate clock generation circuitry 104 may be configured to generate and send clock signals to each of the processing blocks 110 in the pipeline 102. The clock signals that are sent may be variable-rate clock signals in that the variable-rate clock generation circuitry 104 may be configured to dynamically vary the rates of the variable-rate clock signals. In particular, the rates may vary based on feedback information from the pipeline 102 and an operation mode of the pipeline 102. As described in further detail below, the feedback information may include fill levels of the input and output FIFO buffers and busy statuses of the processing circuit blocks 110. The operation mode may be either a performance mode or a reduced-power mode. Based on the feedback information and the operation mode, the de-rating value generation circuitry 106 may generate de-rating values, which determine the clock rates of the variable-rate clock signals sent to the processing circuit blocks 110.

The variable-rate clock generation circuitry 104 and the de-rating value generation circuitry 106 may determine the rates and generate the variable-rate clock signals independently and/or differently for each of the processing circuit blocks 110. As shown in FIG. 1, the variable-rate clock generation circuitry 104 may send a first variable-rate clock signal Var_Clk_A to processing circuit block A, a second variable-rate clock signal Var_Clk_B to processing circuit block B, and a third variable-rate clock signal Var_Clk_C to processing circuit block C. These variable-rate clock signals may have the same or different rates from each other, depending on the fill levels and/or busy statuses of the respective processing circuit blocks 110 to which they are being sent.

However, even though the rates of the variable-rate clock signals may be generated independent of each other, each of the variable-rate clock signals generated by the variable-rate clock generation circuitry 104 and sent to the processing blocks 110 may be generated based on a common or the same clock signal. The common clock signal is described herein as a fixed-rate clock signal Fxd_Clk, although for other example configurations, the rate of the common clock signal may be adjusted In this sense, the variable-rate clock signals generated in the pipeline system 100 may referred to as "sporachronous" clock signals. Qualitatively, this means that pulses of a variable-rate clock signals are sporadic relative to the pulses of the fixed-rate clock signal Fxd_Clk (i.e., they may not occur every time a pulse of the fixed-rate clock signal Fxd_Clk occurs). However, when a pulse of a sporachronous variable-rate clock signal does occur, it is edge-aligned with one or more pulses of the fixed-rate clock signal Fxd_Clk, meaning that the rising edge of the pulse is aligned with a rising edge of a pulse of the fixed-rate clock signal and the falling edge of the pulse is aligned with a falling edge of a pulse (either the same or a different pulse) of the fixed-rate clock signal. Quantitatively, a sporachronous variable-rate clock signal has a rate that is a fraction of the rate of the fixed-rate clock signal Fxd_Clk. Sporachronous variable-rate clock signals derived from the same fixed-rate clock signal Fxd_Clk may have the same denominator and their numerators may be the same or different from each other. Otherwise stated, the rates of sporachronous variable-rate clock signals derived from the same fixed-rate clock signal Fxd_Clk may each be a fraction (M/N) of the rate of the fixed-rate clock signal Fxd_Clk, where M and N are each integers. Each of the numerators M among the variable-rate clock signals generated in the system 100 may the same or different from each other at any given point in time. Similarly, each of the denominators N among the variable-rate clock signals may be the same or different from each other at any given point in time. For each fraction (M/N), M may vary in a range from 0 to N. Accordingly, a minimum rate that may be set for a variable-rate clock signal may be zero—i.e., the determined fraction is (0/N), and a maximum rate that may be set for a variable-rate clock signal may be the rate of the fixed-rate clock signal—i.e., the determined fraction is (N/N). As an example, a denominator of eight may yield a rate of a variable-rate clock signal that is M-eighths of the rate of the fixed-rate clock signal Fxd_Clk, where M is an integer between 0 and 8.

The variable-rate clock generation circuitry 104 may generate the variable-rate clock signals in accordance with a masking scheme in which pulses of the fixed-rate clock signal are masked according to the determined fractions (M/N). Masking one or more pulses of the fixed-rate clock signal may be performed by maintaining the fixed-rate clock signal at either its high level or its low level rather than allowing the fixed-rate clock signal to perform low-to-high (rising) and/or high-to-low (falling) transitions to form the one or more pulses.

Figure 2:
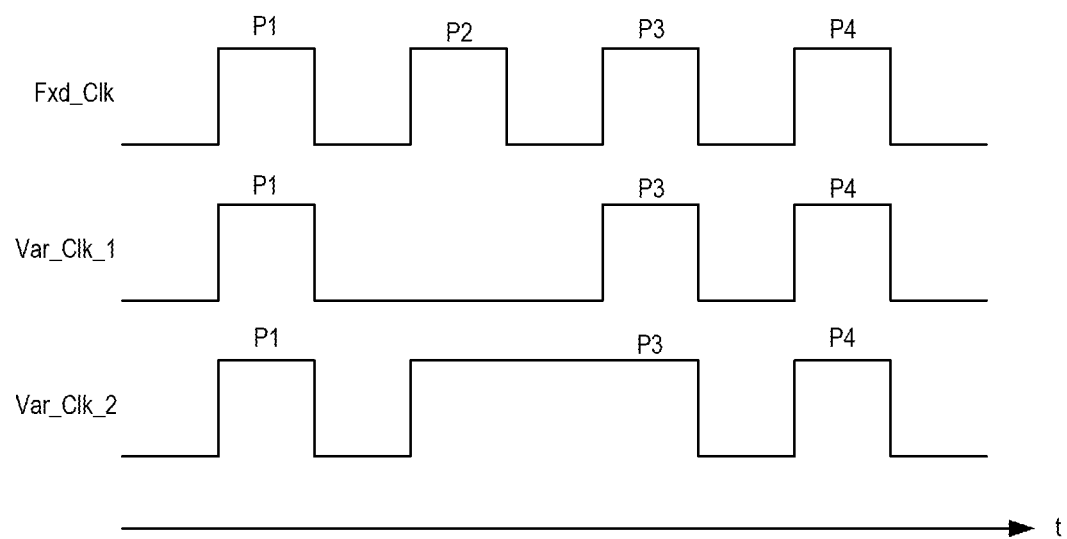
FIG. 2 is a timing diagram of a fixed-rate clock signal and masked-versions of the fixed-rate clock signal.

FIG. 2 shows a timing diagram illustrating various ways of masking a pulse of the fixed-rate clock signal Fxd_Clk. The fixed-rate clock signal Fxd_Clk is shown as including four pulses P1, P2, P3, and P4. Variable-rate clock signals Var_Clk_1 and Var_Clk_2 are each variable-rate clocks generated by masking the second pulse P2 of the fixed-rate clock signal Fxd_Clk. With respect to the first variable-rate clock signal Var_Clk_1, the second pulse P2 may be masked by maintaining the fixed-rate clock signal Fxd_Clk at its low level and preventing the first variable-rate clock signal Var_Clk_1 from performing its rising and falling transition during the time period that the second pulse P2 occurs. The first variable-rate clock signal Var_Clk_1 is then unmasked for the third pulse P3 by allowing the fixed-rate clock signal to perform its rising transition when the third pulse P3 is to occur. With respect to the second variable-rate clock signal Var_Clk_2, the second pulse P2 may be masked by allowing the rising transition of the second pulse P2 to occur, but preventing the falling transition of the second pulse P2 from occurring. That is, the second variable-rate clock signal Var_Clk_2 is maintained at its high level and so when the third pulse P3 is to occur, the second variable-rate clock signal Var_Clk_2 is already at its high level. In this sense, the second pulse P2 is masked by combining the second and third pulses P2 and P3 into a single pulse. The second variable-rate clock signal Var_Clk_2 may then be unmasked by allowing the falling transition of the third pulse P3 to occur. Noted in FIG. 2 for exemplary purposes is that the first and second variable-rate clock signals Var_Clk_1 and Var_Clk_2 are each generated based on a fraction of ¾. That is, the first and second variable-rate clock signals Var_Clk_1 and Var_Clk_2 each include three pulses for every four pulses of the fixed-rate clock signal Fxd_Clk.

Referring back to FIG. 1, the variable-rate clock generation circuitry 104 may include pulse masking circuits 118 that are configured to mask the pulses of the fixed-rate clock signal Fxd_Clk to generate the variable-rate clock signals Var_Clk A, Var_Clk B, and Var_Clk C. The variable-rate clock generation circuitry 104 may further include masking control signal generator circuits 120 that are configured to generate control signals (CS) that instruct the pulse masking circuits 118 when to mask the pulses of the fixed-rate clock signal Fxd_Clk. The masking control signal generator circuits 120 may generate the control signals based on de-rating values received from the de-rating value generation circuitry 106, as described in further detail below.

The pulse masking circuits 118 and the masking control signal generator circuits 120 may be configured into sets, with each set being configured to generate an associated one of the variable-rate clock signals. Each set may include a pulse masking circuit 118 and a masking control signal generator circuit 120. Accordingly, pulse masking circuit A may generate the first variable-rate clock signal Var_Clk A, and masking control signal generator A may provide a control signal CS_A to pulse masking circuit A to control its masking. Similarly, pulse masking circuit B may generate the second variable-rate clock signal Var_Clk B, and masking control signal generator B may provide a control signal CS_B to pulse masking circuit B to control its masking, and pulse masking circuit C may generate the third variable-rate clock signal Var_Clk C, and masking control signal generator C may provide a control signal CS_C to pulse masking circuit C to control its masking.

Figures 3, 4, 5:
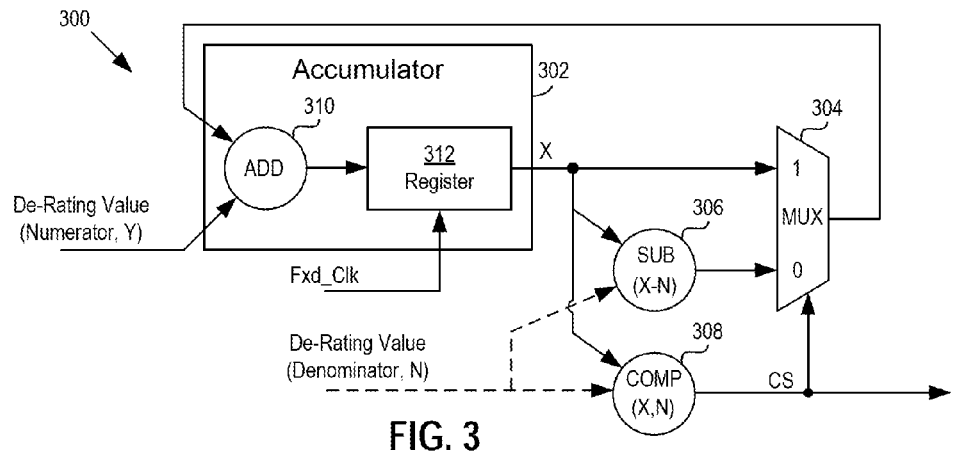
FIG. 3 is a block diagram of an example circuit configuration of a masking control signal generator circuit of FIG. 1.
FIG. 4 is a chart illustrating input and output values generated during clock cycles of an example operation of the masking control signal generator circuit of FIG. 3.
FIG. 5 is a chart illustrating resulting fractions and waveforms corresponding to various possible de-rating values for a denominator value of ten associated with the masking control signal generator circuit of FIG. 3.

FIG. 3 shows a block diagram of an example circuit configuration of a masking control signal generator circuit 300, which may be used for any of the masking control generator circuits 120 of the pipeline system 100 of FIG. 1. The example masking control generator circuit 300 may include an accumulator circuit 302, a multiplexer circuit 304, a subtractor circuit (SUB) 306, and a comparator circuit (COMP) 308. The masking control signal generator circuit 300 may be configured to receive a numerator portion Y of a de-rating value received from the de-rating value generation circuitry 106. The numerator portion Y may determine the numerator for the fraction (M/N) of the rate of the fixed-rate clock signal Fxd_Clk at which to generate the associated variable-rate clock signal. In this circuit configuration 300, Y identifies the number of pulses to be masked per N-number of pulses. Accordingly, M=1−Y. The accumulator 302 may add the numerator portion Y with an output of the multiplexer circuit 304 to generate an accumulated output X. The comparator circuit 308 may compare the accumulated output X with the denominator N of the fraction (M/N). While the accumulated output X is below the denominator N, the comparator circuit 308 may output a control signal CS at a first level that causes an associated pulse masking circuit not to mask pulses of the fixed-rate clock signal Fxd_Clk. Alternatively, when the accumulated output X is greater than or equal to the denominator N, the comparator circuit 308 may output the control signal CS at a second level that causes the associated pulse masking circuit to mask one or more pulses of the fixed-rate clock signal Fxd_Clk. The comparator circuit 308 may output the control signal CS at the second level until the accumulated output X drops to a level below the denominator value N, at which time the comparator circuit 308 may again output the control signal CS at the first level to cause the associated pulse masking circuit to generate the variable-rate clock signal as an unmasked version of the fixed-rate clock signal Fxd_Clk. The frequency or rate at which the comparator 308 outputs the control signal CS at the second level may correspond to the fraction (M/N).

In further detail, the accumulator circuit 302 may include an adder circuit (ADD) 310 and a register 312. The register 312 may be configured to receive the fixed-rate clock signal Fxd_Clk to determine when to store the output of the adder circuit 310. The adder circuit 310 may receive the numerator portion Y of the de-rating value as a first input and an output of the multiplexer circuit 304 as a second input. The output of the multiplexer circuit 304 may either be the accumulated output X, which is sent to a first input of the multiplexer circuit 304 or the output of the subtractor circuit 306, which is sent to the a second input of the multiplexer circuit 304. The output of the subtractor circuit 306 is the difference (X−N) of the accumulated output X and the denominator N. As shown in FIG. 3, the controls signal CS is used to control or select which of the inputs, either the accumulated output X or the difference (X−N), that the multiplexer circuit 304 feeds back to the adder circuit 310. When the accumulated output X is less than the denominator N as determined by the comparator circuit 308, the comparator circuit 308 may output the control signal CS at a level that causes the multiplexer circuit 304 to output the accumulated output X. Alternatively, when the accumulated output X is greater than or equal to the denominator value N, the comparator circuit 308 may output the control signal CS at a level that causes the multiplexer circuit 304 to output the difference (X−N), as determined and output from the subtractor circuit 308.

For the example circuit configuration 300, the first input of the multiplexer circuit 304 receiving the accumulated output X is a logic 1 input, and the second of the multiplexer circuit 304 receiving the difference (X−N) is a logic 0 input. Accordingly, when the accumulated output X is below the denominator value N, the control signal (CS) will be at a high or logic 1 level so that the accumulated output X is fed back to the adder circuit 310. In this way, the control signal at its high or logic 1 level is the level that is input to its associated pulse masking circuit to leave the received pulses of the fixed-rate clock signal Fxd_Clk unmasked. Alternatively, when the accumulated output X is greater than or equal to the denominator value N, the control signal (CS) will be at a low or logic 0 level so that the difference (X−N) is fed back to the adder circuit 310. In this way, the control signal at its low or logic 0 level is the level that is input to its associated pulse masking circuit to mask one or more pulses of the fixed-rate clock signal Fxd_Clk.

Additionally, for some example implementations, one or both of the subtractor circuit 306 and the comparator circuit 308 may be designed or pre-configured with the denominator value N such that their only input is the accumulated output X. For these implementations, the denominator value N may be static. For other example implementations, the denominator value N may be a denominator portion of the de-rating value received from the de-rating value generation circuitry 106, as denoted by the dotted arrows in FIG. 3. For these implementations, the denominator value N may be static or dynamic. Accordingly, depending on the implementation, the de-rating value received from the de-rating value generation circuitry 106 may include only the numerator portion Y, or may include both the numerator portion Y and the denominator portion N.

Initially, the accumulated output X may be equal to the numerator portion Y. Assuming that the numerator portion Y is not 1, then the accumulated output X will be less than N, and the comparator circuit 308 may output the control signal CS at a level that causes the multiplexer circuit 304 to output the accumulated output X, which initially is the numerator portion Y. The numerator portion Y is then fed back from the multiplexer circuit 304 to the second input of the adder circuit 310, which is added to the numerator portion Y being received at the first input of the adder circuit 310. The output of the adder circuit 310, which in this case is twice the numerator portion (2×M) is sent to the register 312, which latches onto the output from the adder circuit 310, and in turn outputs (2×M) as the accumulated output X. Assume hypothetically that (2×M) is still less than the denominator N. In that case, the multiplexer circuit 304 sends (2×M) as its output back to the second input of the adder circuit 310. The adder circuit 310 adds (2×M) received at its second input with the numerator portion Y applied at its first input and sends the resulting sum of three times the numerator portion (3×M) to the register 312. Assume hypothetically that (3×M) is greater than or equal to the denominator N. In that case, the comparator circuit 308 outputs the control signal CS at a level that causes the multiplexer to output the difference (X−N) back to the second input of the adder circuit 310, which will add the difference (X−N) with the numerator portion Y being received at the first input.

FIG. 4 is a table illustrating operation of the example masking control signal generator circuit 300, where the numerator portion Y of the de-rating value is 3, the denominator N is 10, and so the resulting fraction (M/N) is 7/10, meaning that the associated variable-rate clock signal is generated to have a rate that is seven-tenths (70%) the rate of the fixed-rate clock signal Fxd_Clk. In particular, the table in FIG. 4 identifies, for eleven consecutive clock cycles, the first and second inputs to the accumulator circuit 302, whether the accumulated output X is greater than or equal to the denominator value N (in this case 10), and the resulting multiplexer output. The table assumes that the numerator portion Y is constant at three for the eleven clock cycles.

Starting with the first clock cycle, the second accumulator input receives a value of zero from the multiplexer circuit 304, which yields an accumulated output of three. Since three is less than ten, then the multiplexer circuit 304 outputs the accumulated output of three back to the second input of the adder circuit 310. In the second clock cycle, since the accumulated output of six is still less than ten, then the multiplexer circuit 304 outputs the accumulated output of six back to the second input of the adder circuit 310. In the third clock cycle, since the accumulated output of nine is still less than ten, then the multiplexer circuit 304 outputs the accumulated output of nine back to the second input of the adder circuit.

During these first three clock cycles, since the accumulated output X is less than the denominator value of ten, then the control signal CS is output at its first level to cause the multiplexer circuit 304 to output the accumulated output X instead of the difference (X−N). This first level is also the level that the masking control signal generator circuit may send to its associated pulse masking circuit to pass the pulses of the fix-rate clock signal Fxd_Clk it receives to its associated processing circuit block without masking them.

In the fourth clock cycle, the accumulated output is twelve, which is greater than ten, and so the comparator circuit 308 switches the level of the control signal CS from the first level to the second level to cause the multiplexer circuit 304 to output the difference (X−N) generated by the subtractor circuit 306 instead of the accumulated output X, and to cause its associated pulse masking circuit to perform masking. In the fifth clock cycle, the accumulated output X is five, which is less than ten, and so the comparator circuit 308 outputs the control signal CS at the first level to cause the multiplexer circuit 304 to switch back to sending the accumulated output X back to the second input of the adder circuit 310, and the associated pulse masking circuit to resume passing the fixed-rate clock signal Fxd_Clk to the associated processing circuit block without masking pulses.

In the sixth clock cycle, since the accumulated output X of eight is less than ten, then the multiplexer circuit 304 outputs the accumulated output X of eight back to the second input of the adder circuit 310. In the seventh clock cycle, the accumulated output X of eleven is greater than ten, and so the comparator circuit 308 outputs the control signal CS at a level to cause the multiplexer to switch to output the difference (X−N), which in this case is one, back to the second input of the adder 310 and also to cause the associated pulse masking circuit to mask the seventh pulse of the fixed-rate clock signal Fxd_Clk. In the eighth clock cycle, the accumulated output X is four, which is less than ten, and so the comparator circuit 308 outputs the control signal CS at a level that causes the multiplexer circuit 304 to switch back to outputting the accumulated output X back to the second input of the adder circuit 310, and the associated pulse masking circuit to resume passing the fixed-rate clock signal Fxd_Clk to the associated processing circuit block without masking pulses.

In the ninth clock cycle, since the accumulated output X of seven is less than ten, then the multiplexer circuit 304 outputs the accumulated output X of seven back to the second input of the adder circuit 310. In the tenth clock cycle, the accumulated output X of ten is equal to ten, and so the comparator circuit 308 outputs the control signal CS at a level to cause the multiplexer to switch to output the difference (X−N), which in this case is 0, back to the second input of the adder 310 and also to cause the associated pulse masking circuit to mask the fixed-rate clock signal Fxd_Clk. Then, starting with the eleventh clock cycle, the ten cycles repeat due to the output value of zero being applied to the second input of the adder circuit 310. Accordingly, as shown in the table in FIG. 4, with a numerator portion Y set to three, three of the ten pulses were masked, resulting in a clock rate for the variable-rate clock signal to be seven-tenths or 70% of the clock rate for the fixed-rate clock signal Fxd_Clk.

FIG. 5 shows a chart illustrating the resulting fractions (M/N) and waveforms corresponding to the various possible numerator portions Y for a denominator value of 10. As illustrated in FIG. 5, the fractions (M/N) linearly decrease in decrements of one-tenth as the numerator portion Y of the de-rating value linearly increases from zero to ten (in increments of one). Accordingly, by changing the numerator portion Y, the rate of the variable-rate clock signal relative to the fixed-rate clock signal Fxd_Clk can be adjusted linearly in one-tenth increments and decrements.

Figures 6, 7, 8:
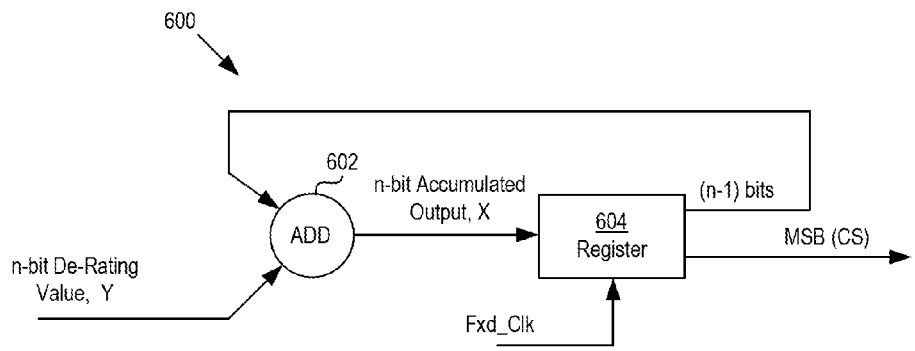
FIG. 6 is a block diagram of another example circuit configuration of the masking control signal generator circuit of FIG. 1.
FIG. 7 is a chart illustrating input and output values generated during clock cycles of an example operation of the masking control signal generator circuit of FIG. 6.
FIG. 8 is a chart illustrating resulting fractions and waveforms corresponding to various possible de-rating values for a denominator value of eight associated with the masking control signal generator circuit of FIG. 6.

FIG. 6 is a block diagram of an example circuit configuration of another masking control signal generator circuit 600, which may be used for any of the masking control generator circuits 120 of the pipeline system of FIG. 1. The masking control signal generator circuit 600 is similar to the accumulator circuit 302 of the masking control signal generator circuit 300 of FIG. 3 in that it includes an adder circuit 602 and a register 604. However, the multiplexer, subtractor, and comparator circuits are omitted in the circuit configuration 600 due to the functions of those components being performed intrinsically by sending back to the adder circuit 602 the (n−1) least significant bits and using a most significant bit (MSB) of the register 604 as the control signal CS.

In further detail, an n-bit numerator portion Y of a de-rating value may be input to the adder circuit 602. A denominator value N may be determined based on the number of bits of the n-bit numerator portion Y. In particular, the denominator value N is $2^{n-1}$. For some example implementations, the number of bits of the n-bit numerator portion Y may always be the same, which may cause the denominator value N to be static. For other example implementations, the number of bits of the n-bit numerator portion Y may vary, which may cause the denominator value N to be dynamic. Hereafter, for simplicity and unless otherwise specified, the numerator portion Y of the de-rating value is simply referred to as the de-rating value. Using the circuit configuration 600, the clock rate of the variable-rate clock signal may be set and/or adjusted in one-$(2^{n-1})$th increments. For example, if the de-rating value Y is a four-bit value, then the rate of the variable-rate clock signal may be adjusted in one-eighth increments and decrements.

A first input of the adder circuit 602 may be configured to receive the n-bit de-rating value Y. The register 604 may include an input that is configured to receive an n-bit accumulated output X that is output from the adder circuit 602. In addition, the register 604 may include a first output that is configured to feed back the (n−1) least significant bits (or the bits other than the most significant bit (MSB)) of the n-bit accumulated output X to a second input of the adder circuit 602. The adder circuit 602 may add the n-bit de-rating value Y with the (n−1) least significant bits of the n-bit accumulated output X to generate another n-bit accumulated output X. The register 604 may further include a second output that is configured to output the most significant bit of the n-bit accumulated output X as the control signal CS.

In operation, as long as the value of the n-bit accumulated output X is less than the denominator value N, the most significant bit of the n-bit accumulated output X will have a logic 0 value, which may cause the associated pulse masking circuit to pass the pulses of the received fixed-rate clock signal to the processing circuit block without masking them. Conversely, when the value of the n-bit accumulated output X is greater than or equal to the denominator value N, the most significant bit of the n-bit accumulated output X may be have a logic 1 value, which may cause the associated pulse masking circuit to perform masking.

FIG. 7 is a table illustrating operation of the example masking control signal generator circuit 600. In the example operation, the n-bit de-rating value Y is four bits in size, which yields a denominator value of eight (i.e., $2^3=8$). Accordingly, the clock rate for the variable-rate clock signal may be set and/or adjusted in one-eighth increments. Also, in the example, the de-rating value Y is three, which in binary is "0011." Similar to the example masking control signal generator circuit 300, the de-rating value Y may identify the number of pulses to mask per N pulses, such that the numerator M of the fraction (M/N) is equal to 1−Y. As such, a de-rating value of 3 may yield a fraction of ⅝, or a clock rate that is ⅝ (62.5%) that of the rate of the fixed-rate clock signal Fxd_Clk. This is illustrated in the table in FIG. 7.

Similar to the table in FIG. 4, the table in FIG. 7 identifies, for nine consecutive clock cycles, the first and second inputs to the adder circuit 602, whether the accumulated output X is greater than or equal to the denominator value N (in this case 8), and the resulting most significant bit (MSB) and (n−1)-bit outputs. The entries in the table are identified first in binary with their respective decimal equivalents in parentheses. Additionally, the table assumes that for the example operation the numerator portion Y is constant at 0011 (three) for the nine clock cycles.

In further detail, in a first clock cycle, the binary value "0011" may be received at the first input of the adder circuit 602, and the (n−1) bits of the accumulated output X received at the second input may be "000." The resulting sum "0011" is less than "1000." The most significant bit, "0" is output by the register 604 as the value of the control signal (CS), which causes the associated pulse masking circuit to generate the variable-rate clock signal without performing masking. The (n−1)-bit value of "011" is fed back to the second input of the adder circuit 602. In the second clock cycle, the accumulated output value of "0110" (decimal value of 6) output by the adder circuit 602 is less than "1000." The level of the most significant bit is still logic 0, and the (n−1)-bit value of "110" is fed back to the second input of the adder circuit 602.

In the third clock cycle, the accumulated output value of "1001" (decimal value of 9) output by the adder circuit 602 is greater than "1000." The most significant bit is now at a logic 1 level, which causes the associated pulse masking circuit to perform masking to generate the variable-rate clock signal. The (n−1)-bit value of "001" is fed back to the second input of the adder circuit 602. In the fourth clock cycle, the accumulated output value of "0100" (decimal value of 4) output by the adder circuit 602 is less than "1000." The level of the most significant bit is again at logic 0, which causes the associated pulse masking circuit not to perform masking. The (n−1)-bit value of "100" is fed back to the second input of the adder circuit 602. In the fifth clock cycle, the accumulated output of "0111" (decimal value of 7) is less than "1000." The level of the most significant bit is still logic 0, and the (n−1)-bit value of "111" is fed back to the second input of the adder circuit 602.

In the sixth clock cycle, the accumulated output of "1010" (decimal value of 10) is greater than "1000." As such, the level of the most significant bit changes to logic 1, causing the associated pulse masking circuit to perform masking to generate the variable-rate clock signal. The (n−1)-bit value of "010" is fed back to the second input of the adder circuit 602. In the seventh clock cycle, the accumulated output of "0101" (decimal value of 5) is less than "1000." As such, the level of the most significant bit changes back to logic 0, and the (n−1) bit value of "101" is fed back to the second input of the adder circuit 602. In the eighth clock cycle, the accumulated output of "1000" (decimal value of 8) is equal to "1000." As such, the level of the most significant bit is logic 1. The (n−1)-bit value of "000" is fed back to the second input of the adder circuit 602. Then, starting with the ninth clock cycle, the eight cycles repeat due to the (n−1)-bit value of "000" being applied to the second input of the adder circuit 602. Accordingly, as shown in the table in FIG. 7, with a de-rating value Y set to three, three of the eight pulses were masked, resulting in a clock rate for the variable-rate clock signal to be five-eighths of the clock rate for the fixed-rate clock signal Fxd_Clk.

FIG. 8 shows a chart illustrating the resulting fractions (M/N) and waveforms corresponding to the various possible de-rating values Y for a denominator value of 8. As illustrated in FIG. 8, the fractions (M/N) linearly decrease in decrements of one-eight as the de-rating value Y linearly increases from zero to eight (in increments of one). Accordingly, by changing the de-rating value, the rate of the variable-rate clock signal relative to the fixed-rate clock signal can be adjusted linearly in one-eighth increments and decrements.

Figure 9:
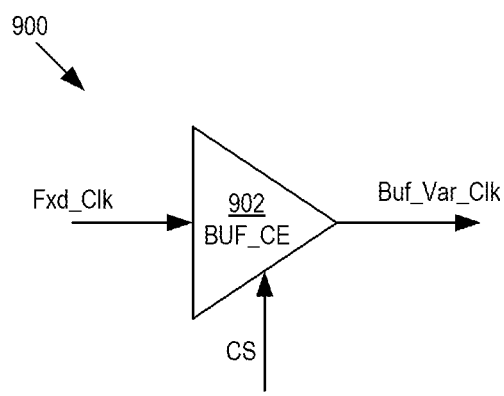
FIG. 9 is a block diagram of an example circuit configuration of a pulse masking circuit of FIG. 1.
Figure 10:
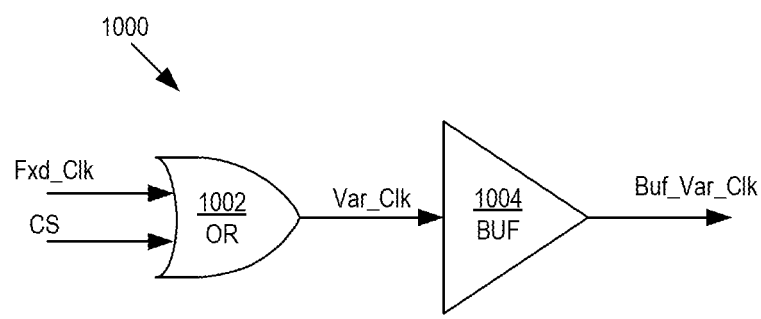
FIG. 10 is a block diagram of another example circuit configuration of the pulse masking circuit of FIG. 1.

Referring back to FIG. 1, the masking control signal generator circuits 120 may each be configured to send their respective control signal CS to an associated pulse masking circuit 118. Each of the pulse masking circuits 118 may be configured to receive pulses of the fixed-rate clock signal Fxd_Clk and either mask or leave as unmasked each of the pulses to generate a variable-rate clock signal. FIGS. 9 and 10 show two example configurations of pulse masking circuits, either or a combination of which may be used for the pulse masking circuits 118 shown in FIG. 1.

Referring to FIG. 9, in one example configuration, a pulse masking circuit 900 may include a chip-enabled buffer 902 to mask the pulses of the fixed-rate clock signal Fxd_Clk. The chip-enabled buffer 902 may receive a control signal CS as a chip enable input signal, and determine whether to mask a pulse of the received fixed-rate clock signal Fxd_Clk based on the level of the control signal CS. In particular, when the chip-enabled buffer 902 receives the control signal CS at a first level, the chip-enabled buffer 902 may determine to allow a received pulse of the fixed-rate clock signal Fxd_Clk to pass without performing masking, and when the chip-enabled buffer 902 receives the control CS at a second level, the chip-enabled buffer 902 may determine to mask a received pulse. In some configurations, the first level may be a high level and the second level may be a low level, although the reverse may be the case for other example configurations. Also, as a buffer, the chip-enabled buffer 902 may output the variable-rate clock signal as a buffered variable-rate clock signal Buf_Var_Clk.

Referring to FIG. 10, the example clock masking circuit 1000 may include logic circuitry to perform the masking, instead of a chip-enabled buffer circuit. In the circuit 1000 shown in FIG. 10, the logic circuitry includes an OR gate logic circuit 1002 that is configured to perform logic OR operations on a pair of received input signals. In particular, the OR gate logic circuit 1002 may receive the fixed-rate clock signal Fxd_Clk at a first input and the control signal CS at a second input. In accordance with the OR logic, the OR gate logic circuit 1002 may mask pulses of the fixed-rate clock signal Fxd_Rate when the control signal CS is at its high (logic 1) level. That is, when the control signal CS is at its high level, the output of the OR gate logic circuit 1002 will be a high level, regardless of the level of the fixed-rate clock signal Fxd_Clk, hence masking the fixed-rate clock signal Fxd_Clk. The output of the OR gate logic circuit 1002 is then the variable-rate clock signal Var_Clk. For design purposes, to be consistent with the chip-enabled buffer configurations, a buffer (e.g., one that is not chip-enabled) may be included at the output of the OR gate logic circuit 1002 to receive the variable-rate clock signal Var_Clk and generate a buffered variable-rate clock signal Buf_Var_Clk.

Although not shown as being part of the example pulse masking circuits 900 or 1000 in FIGS. 9 and 10, or as being part of the example masking control signal generator circuits 300 or 600 in FIGS. 3 and 6, inverter circuitry may optionally be used to invert the control signal CS before it is received by the pulse masking circuitry as needed in order to mask the pulses of the fixed-rate clock signal Fxd_Clk as desired. As examples, with reference to FIG. 3, the comparator circuit 308 outputs its control signal CS at a low level when it wants masking to be performed. If the pulse masking circuit 900 is used with the masking control signal generator 300 to mask pulses, and its chip-enabled buffer 902 masks the pulses upon receipt of the control signal CS at the low level, then no inverter may be needed before the control signal CS is sent to the chip-enabled buffer 902. However, if the pulse masking circuit 1000 is used with the masking control signal generator 300 to mask pulses, since the OR gate logic circuit 1002 performs masking when the control signal CS is at a high level, then an inverter circuit may be used to invert the control signal CS before it is sent to the OR gate logic circuit 1002. On the other hand, referring to FIG. 6, the register 604 outputs its control signal CS (i.e., the MSB) at a high level when it wants masking to be performed. As such, if the pulse masking circuit 900 is used with the masking control signal generator 600 to mask pulses, then an inverter may be coupled to the output of the register 604 to invert the control signal CS before it is sent to the chip-enabled buffer 902. However, if the pulse masking circuit 1000 is used with the masking control signal generator 600 to mask pulses, then no inverter may be needed since the OR gate logic circuitry masks 1002 pulses when the control signal is at the high level. Various circuit configurations other than the ones shown in FIGS. 9 and 10, including other configurations involving chip-enabled buffers, logic circuits, and/or inverters, to mask pulses of a fixed-rate clock signal based on a control signal received from an associated masking control signal generator circuit may be possible.

Referring back to FIG. 1, as previously mentioned, the variable-rate clock generation circuitry 104 may be configured to set or adjust the rates of the variable-rate clock signals Var_Clk based on busy statuses of the processing circuit blocks, fill levels of the input and output FIFO buffers, and/or an operation mode. A busy status may indicate that a processing circuit block is in one of two states—busy or idle. A busy state may indicate that the processing circuit block is processing data that is being sent through the main data flow path of the pipeline 102, or at least has identified data in its input FIFO buffer that it is going to process. An idle state may indicate that the processing circuit 110 is not processing data that is being sent through the main data flow path of the pipeline 102 and it has not identified data in its input FIFO buffer that it is going to process.

A fill level of a FIFO buffer may identify a portion, such as a fraction or a percentage, of the total capacity of the FIFO buffer that is currently storing or being filled with data. In addition or alternatively, a fill level may identify a number of data storage locations currently storing data or otherwise currently in use. In addition, a fill level of an output FIFO buffer for one processing circuit block 110 may be also be the fill level of an input FIFO for another processing circuit block.

The operation mode may include a performance mode and a reduced-power mode. The processing circuit blocks 110 in the pipeline 102 may be configured to operate in one of the two modes. In the performance mode, the main priority or goal of the processing circuit blocks 110 may be to process data with minimum latency. A secondary priority or goal when operating in the performance mode may be to minimize power consumption when processing the data. In the reduced-power mode, the main priority or goal of the processing blocks 110 may be to minimize power consumption when processing the data. A secondary priority or goal when operating in the reduced-power mode may be to provide maximum performance (in terms of throughput and/or latency).

One way power consumption may be reduced is by minimizing the number of clock pulses of the variable-rate clock signals that are wasted. That is, power is consumed when a clock pulse occurs even if data is not processed on that pulse. As such, a clock pulse may be wasted, resulting in wasted or needlessly consumed power, if the clock pulse occurs but the processing circuit block 110 does not process data on that clock pulse. On the other hand, power may be saved or conserved by not having the pulse occur if the processing circuit block 110 is unable to process data on the pulse.

One way clock pulses may be wasted is when a processing circuit block 110 enters into the idle state. Since a processing circuit block 110 is not processing any data in the idle state, pulses of the variable-rate clock signal that occur while the processing circuit block 110 is idle may be wasted. As such, it may be desirable to prevent a processing circuit from entering into the idle state in order to save power. One way to prevent a processing circuit block 110 from entering into the idle state may be to set the rate of the variable-rate clock signal to a level that ensures that the processing circuit block 110 does not process data so fast that it runs out of data to process. Another way to prevent a processing circuit block 110 from entering into the idle state may be to set the rate of the variable-rate clock signal sent to the upstream processing circuit block 110 to a fast enough level to ensure that the processing circuit block 110 has data to process.

Another way clock pulses may be wasted is when a processing circuit block 110 stalls or stops processing data. Similar to being in the idle state, a processing circuit block 110 may not process data when stalled. As a consequence, pulses of the variable-rate clock signal that occur may be wasted. A processing circuit block may stall if its output FIFO buffer runs out of storage space to store data that the processing circuit block processes. Because the processing circuit block has nowhere to put the data, it stalls. In order to prevent a processing circuit block from stalling, the rate of the variable-rate clock signal may be set to a sufficiently low level that prevents the processing circuit block from filling up its output FIFO buffer too quickly. In addition or alternatively, from the perspective of the downstream processing circuit block, the rate of its variable-rate clock signal may be set to a sufficiently high level to prevent its input FIFO buffer from filling up to too high of a level A third way clock pulses may be wasted is when a processing circuit block 110 uses more clock pulses to process data than necessary. Those pulses that occurred unnecessarily may result in needlessly consumed power. In order to reduce power consumption, the rate of the variable-rate clock signal may be reduced so that only those pulses that are needed to process the data set actually occur.

The rates at which the variable-rate clock signals are set and/or adjusted to may depend on the mode of operation in which the processing circuit blocks 110 are operating. For example, if the processing circuit blocks 110 are operating in the performance mode, it may be desirable for the rates of the variable-rate clock signals to be set as high as possible so that the processing circuit blocks 110 may process data as quickly as possible. Alternatively, if the processing circuit blocks 110 are operating in the reduced-power mode, it may be desirable for the rates of the variable-rate clock signals to be set so that the processing circuit blocks 110 waste as few pulses of the variable-rate clock signals as possible.

Figure 11:
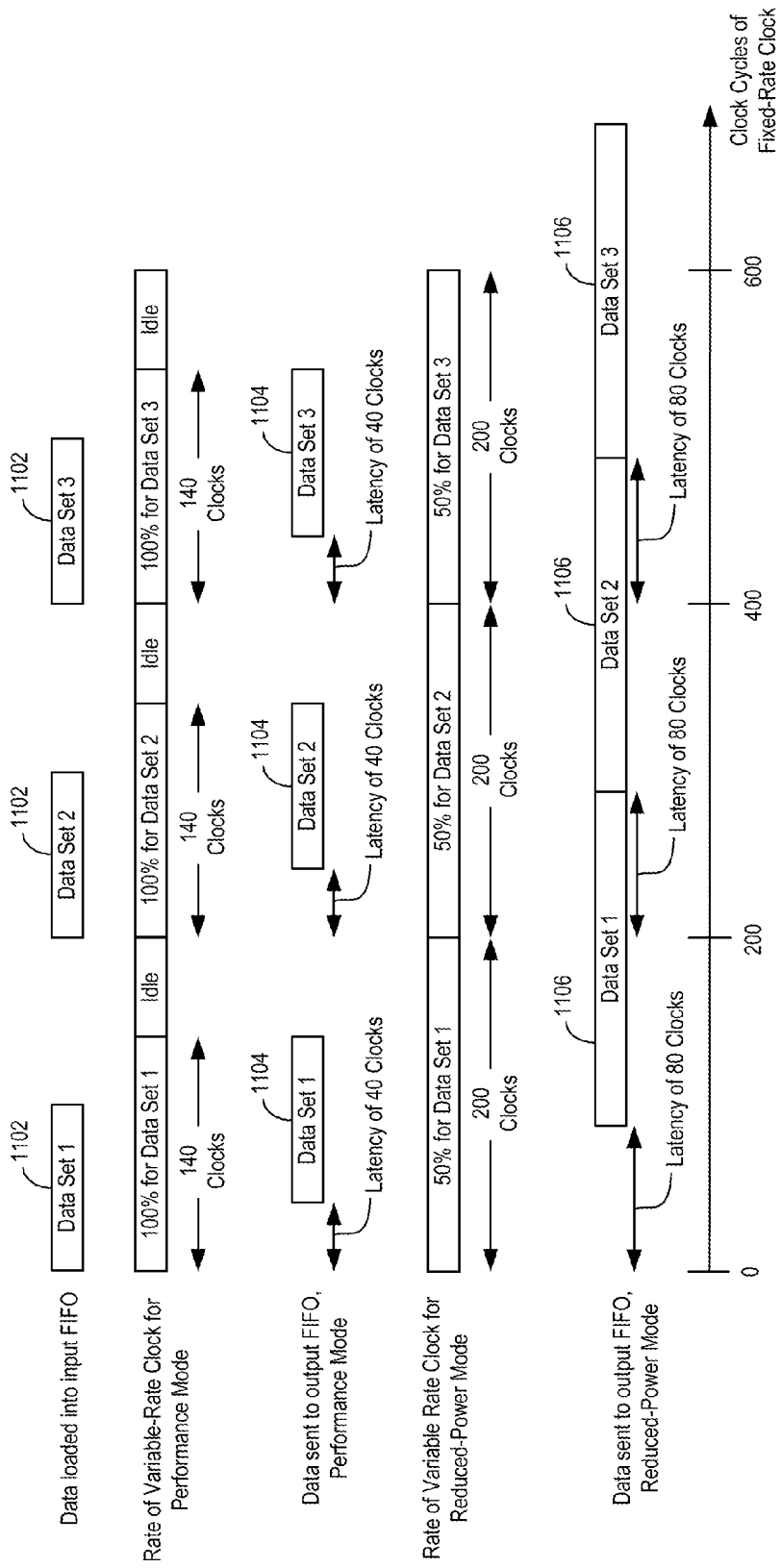
FIG. 11 is a timing diagram of data being processed by a processing circuit block in performance and reduced-power modes of operation.

FIG. 11 is a timing diagram illustrating how a rate of a variable-rate clock signal used for operation of a processing circuit block may be set for the different operating modes. The example shown in FIG. 11 assumes data sets 1102 are loaded into the input FIFO buffer of the processing circuit block every 200 clock cycles of the fixed-rate clock signal. In the performance mode, the rate of the variable-rate clock signal is set to 100% of the fixed-rate clock signal in order to process the data as quickly as possible and achieve minimum latency. When operating at 100%, the processing circuit block may need 140 clock cycles of the variable-rate clock signal at the 100% rate to process the data. Since a next data set 1102 arrives every 200 clock cycles of the fixed-rate clock signal, the processing circuit block may enter into an idle period of 60 fixed-rate clock cycles before the next data set 1102 arrives. Once the next data set 1102 arrives, the processing circuit block may then process that data set using 140 clock cycles of the variable-rate clock signal at 100% of the rate of the fixed-rate clock. The example in FIG. 11 further shows that when operating in the performance mode, the processing circuit block is able to finishing processing the data sets and load the processed data sets 1104 into its downstream FIFO buffer with a latency of 40 fixed-rate clock cycles.

In the example, the processing circuit block may be able to process each of the data sets 1102 using only 100 clock cycles of the variable-rate clock signal at a reduced rate for each data set. Since the data sets 1102 arrive every 200 clock cycles of the fixed-rate clock, then for the reduced-power mode, the rate of the variable-rate clock signal may be reduced or scaled-down to 50% of the fixed-rate clock. This way, the processing circuit block may still process each of the data sets 1102 within the 200 fixed-rate clock cycle periods before a next data set 1102 arrives, but may do so at a reduced rate so that it uses only 100 clock cycles and not 140 clock cycles of the variable-rate clock signal. In addition, by operating at the scaled-down rate of 50%, the processing circuit block may avoid entering into the idle state. In turn, power may be reduced by using only 100 clock cycles of the variable-rate clock signal at the 50% reduced rate to process each of the data sets instead of 140 clock cycles of the variable-rate clock signal at the 100% rate, and also by avoiding entering into the idle state. FIG. 11 also shows that when operating in the reduced-power mode, the processing circuit block is able to finish processing and load the processed data sets 1106 into its downstream FIFO buffer with a latency of 80 fixed-rate clock cycles.

The example in FIG. 11 illustrates the tradeoffs between latency and power that may be experienced when operating in the two different modes. In the example, when operating in the performance mode, the processing circuit block was able to output each of the data sets 1102 with a latency of only 40 fixed-rate clock cycles but used 140 clock cycles of the variable-rate clock signal at the 100% rate per data set for processing. In addition, in the performance mode, the processing circuit block entered into the idle state after processing each data set 1102 because it finished processing before a next data set arrived. In contrast, when operating in the reduced-power mode, the processing circuit block output each of the data sets 1102 with an increased latency of 80 fixed-rate clock cycles, but used a reduced-number of clock cycles of the variable-rate clock signal at the reduced 50% rate per data set (100) to process them. In addition, in the reduced power mode, the processing circuit block did not enter into the idle state in between processing each of the data sets 1102.

Ideally, work loads (i.e., the amount of data a processing circuit block has to process and/or an amount of time required for the processing circuit block to process the data) are the same among the various processing circuit blocks 110 in the pipeline 102. For these ideal situations, the processing blocks 110 may process data as fast as possible without clock pulses being wasted. However, in some situations, work loads among the various processing blocks 110 may vary. For these situations, having the processing circuit blocks 110 each process data as fast as possible may cause pulses of the variable-rate clock signals to be wasted due to the processing circuit blocks 110 entering into the idle state, stalling, and/or using too many clock cycles to process data. As such, it may be desirable to adjust, such as by scaling down, the rates of one or more of the variable-rate clock signals in order to minimize the number of pulses that are wasted.

At any given point in time during operation of the pipeline system 100, each of the rates of the variable-rate clock signals may be set and/or adjusted to a maximum rate, a scaled-down rate, or an idle rate. The maximum rate may be the rate of the fixed-rate clock signal Fxd_Clk or another maximum rate for the variable-rate clock signals generated by the variable-rate clock signal generation circuitry 104. The scaled-down rate may be a rate that is less than the maximum rate. The idle rate may be a rate for the variable-rate clock signal when an associated processing circuit block is in the idle state.

When a processing circuit block is in the idle state, the rate of the variable-rate clock signal sent to that processing circuit block may be the idle rate. Alternatively, when a processing circuit block is busy (i.e., not idle), the rate of the variable-rate clock signal may be set to either the maximum rate or to a scaled-down rate. Whether the rate is set to the maximum rate or a scaled-down rate, and if set to the scaled-down rate how much the rate is scaled down, may depend on which operation mode the processing circuit block is operating in, and may further depend on the fill levels of the input and output FIFO buffers relative to predetermined target levels. A target level of a FIFO buffer may correspond to a desired or optimum rate at which to process data to minimize the number of wasted clock pulses. A fill level of a FIFO buffer relative to the target level of the FIFO buffer may indicate whether a current rate of the variable-rate clock signal should be increased, decreased, or maintained.

In further detail, the target level of an output FIFO buffer may correspond to a desired rate at which its associated processing circuit block may process data so that the fill level of the output FIFO buffer does not increase to its maximum capacity level, which may cause the processing circuit block to stall, or decrease down to an empty level, which may cause the downstream processor circuit block to enter into the idle state since it will run out of data to process.

As such, a fill level at the target level of an output FIFO buffer may indicate that the processing circuit block should maintain its current processing rate. However, a fill level above the target level of the output FIFO buffer may indicate that the fill level is too high and may increase to the maximum capacity level if the processing circuit block continues to process data at its current rate. Accordingly, a fill level above a target level of an output FIFO buffer may indicate that the processing circuit block should reduce its current processing rate in order to reduce the fill level of the output FIFO buffer. On the other hand, a fill level below the target level of the output FIFO buffer may indicate that the fill level is too low and may decrease down to the empty level if the processing circuit block continues to process data at its current rate. Accordingly, a fill level below a target level of an output FIFO buffer may indicate that the processing circuit block should increase its current processing rate in order to increase the level of the output FIFO buffer.

Similarly, a target level of an input FIFO buffer may correspond to a desired rate at which its associated processing circuit block may process data so that the fill level of the input FIFO buffer does not increase to the maximum capacity level, which may cause the upstream processor circuit block to stall, or decrease down to the empty level, which may cause the processing circuit block to enter into the idle state since it will run out of data to process. As such, a fill level at the target level of an input FIFO buffer may indicate that the processing circuit block should maintain its current processing rate. However, a fill level above the target level of the input FIFO buffer may indicate that the fill level is too high and may increase to the maximum capacity level if the processing circuit block continues to process data at its current rate. Accordingly, a fill level above a target level of an input FIFO buffer may indicate that the processing circuit block should increase its current processing rate in order to reduce the fill level of the input FIFO buffer. On the other hand, a fill level below the target level of the input FIFO buffer may indicate that the fill level is too low and may decrease down to the empty level if the processing circuit block continues to process data at its current rate. Accordingly, a fill level below a target level of an input FIFO buffer may indicate that the processing circuit block should decrease its current processing rate in order to increase the level of the input FIFO buffer.

A rate of a variable-rate clock signal may be set and/or adjusted to the maximum rate or a scaled-down rate based on a fill level of an output FIFO buffer, a fill level of an input FIFO buffer, or both. Whether the rate is based on the output FIFO buffer fill level and/or the input FIFO buffer fill level may depend on the operation mode. In the performance mode, when the fill level of its output FIFO buffer is below the target level, the associated rate of the variable-rate clock signal may be set to the maximum rate so that the processing circuit block processes data and sends it downstream as fast as possible. The rate may be set to the maximum rate without consideration of the fill level of the input FIFO buffer. Alternatively, when the fill level of the output FIFO buffer rises above the target level, then the rate may be scaled down from the maximum rate so that the fill level does not increase to the maximum capacity level of the output FIFO buffer. That is, the fill level of the output FIFO buffer increasing to above the target level may indicate that the downstream processing circuit block is limiting data flow and so processing data faster may not improve performance of the pipeline 102. Therefore, processing may be slowed down to prevent the output FIFO buffer from reaching the maximum capacity level, in turn preventing the processing circuit block from stalling. The amount that the rate is scaled down may be in proportion to the amount that the fill level is above the target level. In addition or alternatively, the rate may be continuously scaled down from its current rate, such as in linear decrements, until the fill level of the output FIFO buffer falls to below the target level.

Also, when scaling down the rate, the fill level of the input FIFO buffer may be taken into consideration if the fill level is below the target level. In this situation, the fill level of the input FIFO buffer also indicates that the rate should be reduced. As such, the rate may be scaled down according to whichever fill level indicates the greatest amount of scaling down. As an illustration, if the fill level of the output FIFO buffer above its target level indicates that the rate should be scaled down to 80% of the rate of the fixed-rate clock signal Fxd_Clk whereas the fill level of the input FIFO buffer below its target level indicates that the rate should be scaled down to 40% of the rate of the fixed-rate clock signal Fxd_Clk, then the rate may be set to a scaled-down rate according to the fill level of the input FIFO buffer instead of the fill level of the output FIFO buffer.

On the other hand, if the fill level of the input FIFO buffer is above the target level, then then fill level of the input FIFO buffer may not be considered when scaling down the rate. In this situation, any rate adjustment to occur in order to bring down the fill level of the input FIFO buffer toward the target level may be managed upstream. That is, the fill level of the input FIFO buffer being above the target level may be identified upstream as the fill level of the upstream processing circuit block's output FIFO buffer being above the target level. The rate of the variable-rate clock signal used for operation of the upstream processing circuit block may be adjusted to reduce the fill level of that FIFO buffer.

In the reduced-power mode, when the fill level of the output FIFO buffer is above the target level, the rate may be scaled down from the maximum rate so that the fill level does not increase to the maximum capacity level of the output FIFO buffer. In addition, similar to the performance mode, the fill level of the input FIFO buffer may be taken into consideration. If the fill level of the input FIFO buffer is below the target level, then the rate may be reduced according to whichever fill level indicates a lower rate. On the other hand, when the fill level of the output FIFO buffer is below the target level, rather than automatically set the rate to the maximum level as is the case with the performance mode, the rate may be set according to the fill level of the input FIFO buffer in order to minimize the number of clock pulses that are wasted. If the fill level of the input FIFO buffer is above the target level, then the rate may be set to the maximum rate in order to retrieve data from the input FIFO buffer as fast as possible to try to lower the fill level toward the target level. In doing so, the rate at which the processing circuit block adds processed data to its output FIFO buffer may increase, which in turn may increase the fill level of the output FIFO buffer toward the target level. In turn, the downstream processing circuit block may be prevented from entering into the idle state since it will have more data to process, which may ultimately prevent clock pulses from being wasted. On the other hand, if the fill level of the input FIFO buffer is below the target level, then the rate may be set to a scaled-down rate in proportion to the amount that the fill level is below the target level. In addition or alternatively, the rate may be continuously scaled down from its current rate, such as in linear decrements, until the fill level of the input FIFO buffer reaches the target level.

FIG. 12 is a table showing various rates that may be determined for a variable-rate clock signal sent to a processing circuit block based on different busy statuses of the processing circuit block and different fill levels of its input and/or output FIFO buffers. The different busy statuses identified in the chart are busy and idle. The different FIFO buffer fill levels identified in the chart are: empty, not empty and below the target level, and not empty and above the target level. The rates identified in the chart are for both the performance mode and the reduced-power mode.

Table 12 shows twelve different conditions identifying twelve different combinations of the different processing statuses and fill levels of the input and output buffers. The rates for the different conditions that are determined are shown for each of the performance and reduced-power modes of operation.

In the first condition, the fill level of the input FIFO buffer is empty, the processing circuit block is busy, and the fill level of the output FIFO buffer is empty. In the performance mode, the rate of the variable-rate clock signal may be set to the maximum rate since the processing circuit block wants to send the processed data downstream as quickly as possible and the fill level of the downstream FIFO buffer is below the target level. In the reduced-power mode, the rate of the variable clock signal may be scaled down from the rate of the fixed-rate clock because the input FIFO block is empty, and so the processing circuit block may want to slow down the rate at which it is currently processing the data so that by the time it is done, new data may be loaded into its input FIFO buffer. The rate of the variable-rate clock signal may be scaled down in proportion to an amount of time determined to be remaining before new data arrives in the input FIFO buffer. The scaled down rate may be equal to but not below the idle rate. In addition, because the output FIFO buffer is empty (below the target level), the fill level of the output FIFO buffer may not be a factor in determining how much to scale down the rate for the variable-rate clock signal.

In the second condition, the fill level of the input FIFO buffer is empty, the processing circuit block is busy, and the fill level of the output FIFO buffer is not empty and below the steady state level. Similar to the first condition, in the performance mode, the rate of the variable-rate clock signal may be set to the maximum rate since there are no downstream capacity concerns. In the reduced-power mode, the rate of the variable-rate clock signal may be determined to be scaled down in the same way as determined in the first condition.

In the third condition, the fill level of the input FIFO buffer is empty, the processing circuit block is busy, and the fill level of the output FIFO buffer is not empty and above the target level. In the performance mode, the rate for the variable-rate clock signal may be set to a scaled-down rate in proportion to the amount that the fill level of the output buffer is above the target level. In the reduced-power mode, the rate may be a scaled down rate. The amount that the rate is scaled down may correspond to which of the fill levels yields a greater reduction in rate.

In the fourth through sixth conditions, the input FIFO buffer is empty and the processing circuit block is idle, meaning that the processing circuit block is not processing any data and it does not have any data in its input FIFO buffer to process. As such, in both the performance and reduced-power modes, and regardless of the fill level of the output FIFO buffer, the rate for the variable-rate clock signal may be set to the idle rate.

In the seventh condition, the input FIFO buffer is not empty but the fill level is below its target level, the processing circuit block is busy, and the output FIFO buffer is empty. In the performance mode, the rate for the variable-rate clock signal may be set to the maximum rate. In the reduced-power mode, the rate for the variable-rate clock signal may be set to a scaled-down rate in proportion to the amount that the fill level of the input buffer is below its target level.

In the eight condition, the input FIFO buffer is not empty but the fill level is below its target level, the processing block is busy, and the output FIFO buffer is not empty but the fill level is below its target level. Similar to the seventh condition, in the performance mode, the rate for the variable-rate clock signal may be set to the maximum rate. In the reduced-power mode, the rate for the variable-rate clock signal may be set to a scaled-down rate in proportion to the amount that the fill level of the input buffer is below its target level.

In the ninth condition, the input FIFO buffer is not empty but the fill level is below its target level, the processing circuit block is busy, and the output FIFO buffer is not empty and the fill level is above its target level. In the performance mode, the rate for the variable-rate clock signal may be set to a scaled-down rate in proportion to the amount that the fill level of the output buffer is above the target level. In the reduced-power mode, the rate may be a scaled down rate. The amount that the rate is scaled down may correspond to which of the fill levels yields a greater reduction in rate.

In the tenth condition, the input FIFO buffer is not empty and the fill level is above its target level, the processing circuit block is busy, and the output FIFO buffer is empty. In the performance mode, the rate of the variable-rate clock signal may be set to the maximum rate since there are no capacity concerns with the output FIFO buffer. In the reduced-power mode, the rate of the variable-rate clock signal may also be set to the maximum rate in order to provide data as quickly as possible to the downstream processing circuit block, and to bring the output FIFO buffer to the steady state level, which in turn may prevent the downstream processor from entering into the idle state. In the eleventh condition, the input FIFO buffer is not empty and above the steady state level, the processing circuit block is busy, and the output FIFO buffer is not empty but the fill level is below its target level. Like the tenth condition, the rate for the variable-rate clock signal may be set to the maximum rate for both the performance and reduced-power modes of operation.

In the twelfth condition, the fill level of the input FIFO buffer is above its target level, the processing circuit block is busy, and the fill level of the output FIFO buffer is also above its target level. In this situation, the processing circuit block is processing data too quickly such that its downstream FIFO buffer has filled up to above its target level, indicating that the processing circuit block should slow down its processing rate. However, the fill level of the input FIFO buffer being above its target level indicates that the processing circuit block is processing data too slowly, and so the rate should be increased. In this situation, the rate for the variable-rate clock signal may be set and/or adjusted to the same level for both the performance mode and the reduced-power mode. In particular, the fill level of the output FIFO buffer may override the fill level of the input FIFO buffer, and the rate may be scaled down in proportion to the amount that the fill level of the output FIFO buffer is above its target level. Any rate reduction to be made due to the fill level of the input FIFO buffer being above its target level may be made to the rate of the variable-rate clock signal sent to the upstream processing circuit block. In this manner, reductions in the rates at which processing circuit blocks process data may be managed among the plurality processing circuit blocks in an upstream manner.

Referring back to FIG. 1, in order to set and/or adjust the rates for the variable-rate clock signals, the fill levels of the FIFO buffers 112, 114, 116 may be fed back to the de-rating value generation circuitry 106, which may use that information to generate de-rating values, which in turn may be used by the variable-rate clock generation circuitry 104 to generate the variable-rate clock signals.

In further detail, as shown in FIG. 1, the de-rating value generation circuitry 106 may include a plurality of de-rating value generators 122 configured to generate the de-rating values. Each de-rating value generator 122 may be configured to generate a de-rating value to set and/or adjust a rate of one of the variable-rate clock signals. As such, each de-rating value generator 122 may be configured to send its de-rating value to the one of the masking control signal generators 120 that outputs the control signal used to generate the variable-rate clock signal for which the de-rating value is determined. So, as shown in FIG. 1, de-rating value generator A may send a first de-rating value to and for use by masking control signal generator A, de-rating value generator B may send a second de-rating value to and for use by masking control signal generator B, and de-rating value generator C may send a third de-rating value to and for use by masking control signal generator C.

In order to determine what de-rating value to generate, a de-rating value generator 122 may receive a busy status and fill level information for the processing circuit block that receives the variable-rate clock signal for which the de-rating value is generated. So, as shown in FIG. 1, processing circuit block A may send its busy status and its input FIFO buffer (i.e., FIFO buffer 114) and output FIFO buffer (i.e. FIFO buffer AB) may send information about their fill levels to de-rating value generator A; processing circuit block B may send its busy status and its input FIFO buffer (i.e., FIFO buffer AB) and output FIFO buffer (i.e. FIFO buffer BC) may send information about their fill levels to de-rating value generator B; and processing circuit block C may send its busy status and its input FIFO buffer (i.e., FIFO buffer BC) and output FIFO buffer (i.e., FIFO buffer 116) may send information about their fill levels to de-rating value generator C.

Each of the de-rating value generators 122 may generate their respective de-rating values, such as by selecting which one of a plurality of de-rating values to output, based on the busy status and fill level information it receives and the operation mode the associated processing circuit block is operating in. FIG. 1 shows that the operation mode may be an input that is external to the pipeline system 100 and that is sent to the de-rating value generators 122, although other configurations are possible. For example, in other example configurations, the processing circuit blocks 110 themselves may send operation mode information to the de-rating value generators 122. Also, for some example configurations, the processing circuit blocks 110 in the pipeline 102 may operate in the same operation mode at the same time. Accordingly, the operation mode information sent to each of the de-rating value generators 122 may the same. Alternatively, in other example configurations, some processing circuit blocks 110 may operate in the performance mode while others operate in the reduced-power mode. Accordingly, the operation mode information sent to the de-rating value generators 122 may be the same or different from each other, depending on the operation modes in which each of their corresponding processing circuit blocks 110 are operating in.

The de-rating value generators 122 may be configured to set the de-rating values according to the table in FIG. 12. In particular, the de-rating value generators 122 may determine whether their associated rates should be set to the maximum rate, a scaled-down rate, or the idle rate. Subsequently, the de-rating value generators may generate a de-rating value that corresponds to the determined rate. To illustrate, a de-rating value generator 122 may determine that the rate of an associated variable-rate clock signal is to be set to the maximum rate. Referring to the charts in FIGS. 5 and 8, a de-rating value of zero may yield a fraction (M/N) equal to one, corresponding to the maximum rate of 100% the rate of the fixed-rate clock signal Fxd_Clk. Accordingly, the de-rating value generator 122 may provide a de-rating value of zero to an associated masking control signal generator 120 so that the variable-rate clock signal is generated with a rate equal to the rate of the fixed-rate clock signal Fxd_Clk.

If a de-rating value generator 122 determines that the rate of variable-rate clock signal should be set to the idle rate, the de-rating value generator 122 may select a de-rating value corresponding to the idle rate. In some configurations, the idle rate may be zero—i.e., no clock pulses are generated. As shown in FIGS. 5 and 8, an idle rate of zero may be achieved by outputting a de-rating value that is equal to the denominator value N (ten in the case of FIG. 5, and eight in the case of FIG. 8). For other configurations, the idle rate may be a rate above zero (i.e., a rate where clock pulses are generated).

The idle rate and/or an idle fraction corresponding to the idle rate may be set in various ways. For some example configurations, the idle rate may correspond to a lowest rate at which a processing circuit block is able to operate. In addition or alternatively, the idle rate may be a rate that is below the maximum rate and in some example configurations, the idle rate may be less than or equal to half of the rate of the fixed-rate clock signal and/or the maximum rate at which the variable-rate clock signal may be set.

In addition or alternatively, for some configurations where the idle rate is a rate above zero, the idle rate may be the lowest rate above zero that may be achieved with a de-rating value. What the lowest rate above zero is may depend on whether the denominator value N is static or dynamic. For implementations where the denominator value N is static, the lowest rate above zero may be the lowest rate above zero that may be set in linear increments and decrements. In general, the fraction (M/N) for the idle rate may be equal to the increment or decrement itself. To illustrate, in FIG. 5, linear adjustments are made in one-tenth increments and decrements, and so the lowest rate above zero that may be set with these increments is one-tenth the rate of the fixed-rate clock signal Fxd_Clk. As shown in the chart in FIG. 5, a de-rating value Y of nine yields a fraction (M/N) of one-tenth, and so the de-rating value Y of nine may be used to set the idle rate in that example. Similarly, in FIG. 8, linear adjustments are made in one-eighth increments and decrements, and so the lowest rate above zero that may be set with these increments is one-eighth the rate of the fixed-rate clock signal Fxd_Clk. As shown in the chart in FIG. 8, a de-rating value Y of seven yields a fraction (M/N) of one-eighth, and so the de-rating value Y of seven be used to set the idle rate in that example.

Alternatively, for implementations where the denominator value N is dynamic, the lowest rate above zero may be a rate in between zero and the lowest rate above zero that may be set in linear increments and decrements. To illustrate with reference to the chart in FIG. 5, the idle rate may be greater than zero but less than one-tenth. When the de-rating value generator 122 determines to scale down the rate of the fixed-rate clock signal Fxd_Clk, the de-rating value generator 122 may choose different numerator values Y but keep the denominator value N constant at ten in order to adjust the rate of the variable-rate clock signal in one-tenth increments and decrements. However, if the de-rating value generator 122 determines to set the rate of the variable-rate clock signal to the idle rate, the de-rating value generator 122 may change the denominator value N to a value greater than ten and may set the numerator portion Y to an appropriate value so that the fraction (M/N) is greater than zero but less than one-tenth, such as ½₀, ⅟₁₀₀, or ⅟₁,₀₀₀, as Non-Limiting Examples.

In addition, for some example configurations where the denominator value N is dynamic, the increment itself may be dynamic. To illustrate, using the masking control signal generator 300 of FIG. 3 as an example, during some periods of operation, the de-rating value generator 122 may want the generator 300 to adjust the rate of the variable-rate clock signal in one-tenth increments and so may accordingly provide a denominator value N of ten to the subtractor and comparator circuits 306, 308. During other periods of operation, the de-rating value generator 122 may want the generator 300 to adjust the rate of the variable-rate clock signal in one-eighth increments and so may accordingly provide a denominator value N of eight to the subtractor and comparator circuits 306, 308. In each case, for a constant denominator value N, there is a corresponding range of fractions (M/N) extending from a maximum fraction (N/N) to a minimum fraction greater than zero (1/N). When the de-rating value generator 122 wants to adjust the rate of the variable-rate clock signal, it may generate de-rating values so that the rates of the variable-rate clock signal are at the fractions within the range. Conversely, when the de-rating value generator 122 determines that the rate of the variable-rate clock signal is to be at the idle rate, the de-rating value determined for the idle rate may correspond to a fraction that is outside of the range of fractions used to linearly adjust the variable-rate clock rate. For other example configurations where the denominator value N is dynamic, the de-rating value generated may correspond to the lowest fraction (M/N) within the range, as is the case with a static denominator value N.

In a similar manner, based on the fill level information, the busy status, and the operation mode, if a de-rating value generator 122 determines to set a rate of a variable-rate clock signal to a scaled-down rate, the de-rating value generator 122 may select the de-rating value to correspond to the amount by which the de-rating value generator 122 determined to scale down the rate. For example, looking at the chart in FIG. 5, if the de-rating value generator 122 determines to set the rate of the variable-rate clock signal to 60% (⁶⁄₁₀) of the rate of the fixed-rate clock, then the de-rating value generator 122 may determine to provide a de-rating value of 4 to its associated masking control signal generator. The de-rating value generator 122 may be configured to implement a rounding scheme if necessary in order to determine which de-rating value to output.

In addition, a de-rating value generator 122 may be configured to continually monitor and/or receive the busy status and fill level information from its associated processing circuit block and input and output buffers and adjust the de-rating value it provides as the busy status and fill level information changes. Accordingly, a de-rating value generator 122 may be configured to continually select and/or output different de-rating values based on the changing busy status and fill level information it receives, causing the rate of the variable-rate clock signal it controls to corresponding increments. As previously described, the corresponding increments may be linearly spaced apart, and so by changing the de-rating values, the rate of the variable-rate clock signal may be linearly increased and decreased corresponding to the increments.

The de-rating value generators 122 may be implemented in hardware or a combination of hardware and software. For example, each de-rating value generator 122 may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each de-rating value generator 122 may include memory hardware that comprises instructions executable with a processor or processor circuitry to implement one or more of the features of the de-rating value generator 122.

Referring back to FIG. 1, processing circuit blocks 110 in the pipeline 102 operating with different variable-rate clock signals set to different rates may be referred to as operating in different clock domains. As mentioned, each of the variable-rate clock signals may be sporachronous clock signals, and so the processing circuit blocks 110 may be referred to as operating in different sporachronous clock domains. The FIFO buffers 112 that are configured in between two consecutive processing circuit blocks 110 may be configured to communicate the data from one processing circuit block 110 to the other seamlessly without disruption, corruption, or loss of the data, despite the two consecutive processing circuit blocks operating in different sporachronous clock domains.

The FIFO buffers 112 may be one of two types—an asynchronous FIFO buffer or a synchronous FIFO buffer. The two types of FIFO buffers may differ from each other in terms of the signals each type receives in order to provide for seamless communication of the data. As shown in FIG. 1, FIFO buffer AB is identified as an asynchronous FIFO buffer, and FIFO buffer BC is identified as a synchronous FIFO buffer.

The asynchronous FIFO buffer may presume that the different sporachronous clock signals generated in the different sporachronous clock domains are asynchronous signals, i.e., that they are generated independently or not from the same fixed-rate clock signal Fxd_Clk. Accordingly, the asynchronous FIFO buffer AB be configured to receive the first variable-rate clock signal Var_Clk A and the second variable-rate clock signal Var_Clk B in order to communicate data from processing circuit block A to processing circuit block B. Assuming that the write signal "wr_A" from processing circuit block A is asserted at the first level, the asynchronous FIFO buffer AB may store data being received on its data input upon a transition, such as a rising transition, of the first variable-rate clock Var_Clk A. Similarly, assuming that the read signal "rd_B" from processing circuit block B is asserted at the first level, the asynchronous FIFO buffer AB may send data it is storing on its data output to processing circuit block B upon a transition, such as a rising transition, of the second variable-rate clock Var_Clk B.

On the other hand, a synchronous FIFO buffer may presume that the different sporachronous clock signals generated in the different sporachronous clock domains are synchronous signals. As such, synchronous FIFO buffer BC may use receive the fixed-rate clock signal Fxd_Clk and use it to determine when to store data received from processing circuit block B and send stored data to processing circuit block C. In particular, synchronous FIFO buffer BC may store data and send stored data according to transitions, such as rising transitions, of the fixed-rate clock signal Fxd_Clk.

In addition, rather than receive the second and third variable-rate clock signals Var_Clk B and Var_Clk C, synchronous FIFO buffer BC may receive the second and third control signals CS_B and CS_C used to generate the second and third variable-rate clock signals as chip enable signals. The control signals CS_B and CS_C may be used to instruct the synchronous FIFO buffer BC which transitions of the fixed-rate clock signal Fxd_Clk to use to store and/or send data. In further detail, when the second control signal CS_B is received by pulse masking circuit B at a level that causes pulse masking circuit B not to mask pulses to generate the second variable-rate clock signal Var_Clk B, that level may also cause synchronous FIFO buffer BC to store data it receives from processing circuit block B on rising transitions of the fixed-rate clock signal Fxd_Clk (assuming that the write signal wr_B is asserted to the first level). Conversely, when the second control signal CS_B is received by pulse masking circuit B at a level that causes pulse masking circuit B to mask pulses to generate the second variable-rate clock signal Var_Clk B, that level may also cause synchronous FIFO buffer BC to ignore data it receives from processing circuit block B (even if the write signal wr_B is asserted to the first level) and/or not to store data it receives when a transition of the fixed-rate clock signal Fxd_Clk occurs.

Similarly, when the third control signal CS_C is received by pulse masking circuit C at a level that causes pulse masking circuit C not to mask pulses to generate the third variable-rate clock signal Var_Clk C, that level may also cause synchronous FIFO buffer BC to send data to processing circuit block C on rising transitions of the fixed-rate clock signal Fxd_Clk (assuming that the read signal rd_C is asserted to the first level). Conversely, when the third control signal CS_C is received by pulse masking circuit C at a level that causes pulse masking circuit C to mask pulses to generate the third variable-rate clock signal Var_Clk C, that level may also cause synchronous FIFO buffer BC to not send data it is storing to processing circuit block C on transitions of the fixed-rate clock signal Fxd_Clk (even if the read signal rd_C is asserted to the first level).

Also, as shown in FIG. 1, registers 124 may be included to buffer or delay the control signals CS in order to match the delay of buffer circuitry of the pulse masking circuits 118. That is, as previously described, the pulse masking circuits 118 may include buffer circuitry, such as a chip-enabled buffer 902 as shown in FIG. 9, or an output buffer 1004 as shown in FIG. 10, such that buffered versions of the variable-rate clock signals Buf_Var_Clk are output from the pulse masking circuits 118. The registers 124 may be included to similarly buffer the control signals CS before they are sent to the synchronous FIFO buffers so that they are in phase and alignment with the buffered variable-rate clock signals. Accordingly, FIG. 1 shows buffered versions of the second and third control signals, BUF_CS_B and BUF_CS_C, being sent to synchronous FIFO buffer BC. Similarly, a buffer 126 may be included to buffer the fixed-rate clock signal Fxd_Clk and output a buffered fixed-rate clock signal Buf_Fxd_Clk so that the fixed-rate clock signal remains in alignment with the buffered versions of the variable-rate clock signals and the control signals when sent to synchronous FIFO buffer BC. Other configurations may not buffer the control signals CS and/or the fixed-rate clock signal Fxd_Clk if the variable-rate clock signals Var_Clk are not buffered. Hereafter, for simplicity, the fixed-rate clock signal Fxd_Clk, the variable-rate clock signals Var_Clk, and the control signals CS, and their respective buffered versions Buf_Fxd_Clk, Buf_Var_Clk, and Buf_CS, are referred to collectively as the fixed-rate clock signal Fxd_Clk, the variable-rate clock signals Var_Clk, and the control signals CS, respectively, without concern for whether or not they are buffered, unless otherwise expressly specified.

In addition, FIG. 1 shows FIFO buffer AB as an asynchronous FIFO buffer and FIFO buffer BC as a synchronous FIFO buffer for exemplary purposes in order to illustrate how the two different types of FIFO buffers may be implemented in the pipeline 102. For other example configurations, FIFO buffer AB and FIFO buffer BC may of the same type. For example, both FIFO buffer AB and FIFO buffer BC may be asynchronous buffers or alternatively may both be synchronous FIFO buffers. Additionally, the input buffer 114 for processing circuit block A and the output buffer 116 for processing circuit block C may each be configured as either an asynchronous FIFO buffer or a synchronous FIFO buffer. Various configurations or combinations of configurations for the FIFO buffers 112, 114, 116 as asynchronous and/or synchronous FIFO buffers may be possible.

In addition to communicating data in a main data flow of the pipeline 102, the processing circuit blocks 110 may be configured to communicate data to each other outside of the main data flow using the sporachronous synchronizer circuitry 108. Using the sporachronous synthesizer circuitry 108, any two processing blocks 110, including consecutive or non-consecutive processing blocks 110, may communicate data to each other, and in either the upstream direction or the downstream direction of the pipeline 102.

As shown in FIG. 1, the sporachronous synchronizer circuitry 108 may include a plurality of sporachronous synchronizer circuits 128, each configured to enable communication between two of the processing circuit blocks 110 in a certain upstream or downstream direction. In particular, sporachronous synchronizer AB may be used to communicate data from processing circuit block A to processing circuit block B; sporachronous synchronizer BA may be used to communicate data from processing circuit block B to processing circuit block A; sporachronous synchronizer AC may be used to communicate data from processing circuit block A to processing circuit block C; sporachronous synchronizer CA may be used to communicate data from processing circuit block C to processing circuit block A; sporachronous synchronizer BC may be used to communicate data from processing circuit block B to processing circuit block C; and sporachronous synchronizer CB may be used to communicate data from processing circuit block C to processing circuit block B.

Additionally, as used herein with reference to the sporachronous synchronizer circuitry 108, the term "sender processing circuit block" may refer to the processing circuit block in the pipeline 102 that is sending the data, and the term "receiver processing circuit block" may refer to the processing circuit block in the pipeline 102 that is receiving the data. From the perspective of a sporachronous synchronizer 128, the sender processing circuit block is the processing circuit block 110 in the pipeline 102 from which the sporachronous synchronizer 128 receives the data, and the receiver processing circuit block is the processing circuit block 110 in the pipeline 102 that the sporachronous synchronizer 128 sends the data to.

As shown in FIG. 1, each of the sporachronous synchronizers 128 may be configured to receive the fixed-rate clock signal Fxd_Clk and a plurality of signals from its associated sender and receiver processing circuit blocks. In addition, each sporachronous synchronizer 128 may receive the control signals CS used to generate the variable-rate clock signals that are sent to its associated sender and receiver processing circuit blocks. In addition, each sporachronous synchronizer 128 may be configured to receive the variable-rate clock signal that its sender processing circuit block is receiving. Hereafter, as used with reference to the sporachronous synchronizer circuitry 108, the variable-rate clock signal sent to the sender processing circuit block is referred to as the sender variable-rate clock signal Var_Clk Sender. In addition, the control signal used to generate the sender variable-rate clock signal Var_Clk_Sender is referred to as the sender control signal CS_Sender. Similarly, the variable-rate clock signal sent to the receiver processing circuit block is referred to as the receiver variable-rate clock signal Var_Clk_Receiver. In addition, the control signal used to generate the receiver variable-rate clock signal Var_Clk_Receiver is referred to as the receiver control signal CS_Receiver. For clarity, FIG. 1 does not show the sporachronous synchronizers 128 receiving the sender variable-rate clock signal Var_Clk_Sender or the sender or receiver control signals CS_Sender, CS_Receiver.

As previously mentioned, the variable-rate clock signals generated in the pipeline system 100 may be sporachronous clock signals that have pulses that are edge-aligned with corresponding pulses of the fixed-rate clock signal. As such, when a sender processing circuit block sends or presents new data (i.e., data it has not yet sent or presented), the sender processing circuit block will send or present it upon occurrence of a pulse of the sender variable-rate clock signal Var_Clk_Sender, which will be edge-aligned with one of the pulses of the fixed-rate clock signal Fxd_Clk. Similarly, when a receiver processing circuit block is able to accept or retain new data (i.e., data it has not yet accepted or retained) for processing, the receiver processing circuit block will retain the data upon occurrence of a pulse of the receiver variable-rate clock signal Var_Clk_Receiver, which will also be edge-aligned with one of the pulses of the fixed-rate clock signal Fxd_Clk. By receiving the sender and receiver control signals CS_Sender, CS_Receiver, a sporachronous synchronizer 128 may be able to determine which pulses of the fixed-rate clock signal Fxd_Clk correspond to pulses of the sender variable-rate clock signal Var_Clk_Sender on which the sender processing circuit block is sending new data, and which pulses of the fixed-rate clock signal Fxd_Clk correspond to pulses of the receiver variable-rate clock signal Var_Clk_Receiver on which the receiver processing circuit block retained new data. Upon making these determinations, a sporachronous synchronizer 128 may be able to communicate the data between the sender and receiver processing circuit blocks operating in sporachronous clock domains.

Figure 13:
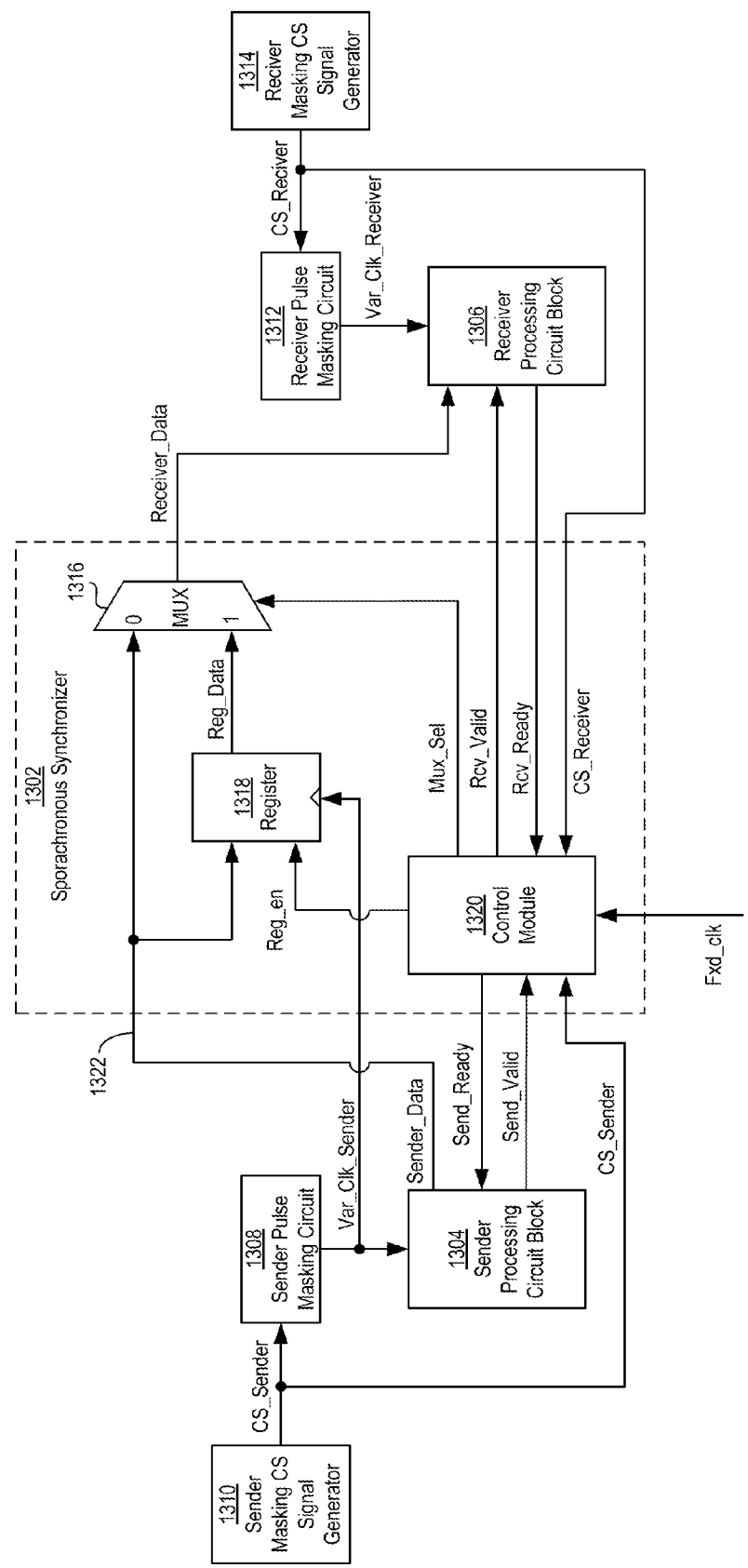
FIG. 13 is a block diagram of an example circuit configuration of a sporachronous synchronizer configured to enable communication between processing circuit blocks.

FIG. 13 shows a block diagram of an example sporachronous synchronizer 1302 that is configured to communicate data outside of the main data flow of the pipeline 102 between a sender processing circuit 1302 and a receiver processing circuit block 1304. The sporachronous synchronizer 1302 may be used for the sporachronous synchronizer 128 of FIG. 1. In addition, the sender processing circuit block 1304 may be representative of one of the processing circuit blocks 110 of the pipeline 102, and the receiver processing circuit block 1306 may be representative of another of the processing circuit blocks 110 of the pipeline 102.

FIG. 13 also shows an associated sender pulse masking circuit 1308 that is configured to send a sender variable-rate clock signal Var_Clk_Sender to the sender processing circuit block 1304, and an associated sender masking control signal generator circuit 1310 that is configured to generate a sender control signal CS_Sender to generate the variable-rate clock signal Var_Clk Sender. In addition, FIG. 13 shows an associated receiver pulse masking circuit 1312 that is configured to send a receiver variable-rate clock signal Var_Clk_Receiver to the receiver processing circuit block 1306, and an associated receiver masking control signal generator circuit 1314 that is configured to generate a receiver control signal CS_Receiver to generate the variable-rate clock signal Var_Clk_Receiver.

The example sporachronous synchronizer 1302 may include a multiplexer (MUX) 1316, a register 1318, and a control module 1320. The control module 1320 may be hardware or a combination of hardware and software. For example, the control module 1320 may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, the control module 1320 may include memory hardware that comprises instructions executable with a processor or processor circuitry to implement one or more of the features of the control module 1320. When the control module 1320 includes the portion of the memory that comprises instructions executable with the processor, the control module 1320 may or may not include the processor. In some examples, the control module 1320 may just be the portion of the memory that comprises instructions executable with the processor to implement the features of the control module 1320 without the control module 1320 including any other hardware. Because the control module 1320 includes at least some hardware even when the included hardware comprises software, each module may be interchangeably referred to as a hardware module.

The data that the sender processing circuit block sends to the sporachronous synchronizer 1302 may be received at a data input 1322. The register 1318 may store the data received at the data input terminal 1308 in case the receiver processing circuit block 1306 is not ready to receive the data. In addition, the data may be sent directly to a first input, identified in FIG. 13 as a logic 0 input, of the multiplexer 1316. The multiplexer 1316 may receive data stored in the register 1304 at a second input, identified as a logic 1 input. Hereafter, data that the sender processing circuit block 1304 presents to the data input 1322 and that is sent directly to the first input of the multiplexer 1316 is referred to as sender data, identified in FIG. 13 as "Sender_Data." Data that the multiplexer 1316 outputs or is presenting to the receiver processing circuit block 1306 is referred to as receiver data, identified in FIG. 13 as "Receiver_Data." Data that the multiplexer 1316 receives at its second input from the register 1318 is referred to as register data, identified in FIG. 13 as "Reg_Data."

The control module 1320 may determine whether it wants the multiplexer 1316 to output the data being received at its data input 1322 to the receiver processing circuit block 1306, or instead data stored in the register 1318. The control module 1320 may output a multiplexer control signal, identified in FIG. 13 as "Mux_Sel" that selects or controls whether the multiplexer 1316 outputs the sender data received at the first input or the register data received at the second input as the receiver data.

As shown in FIG. 13, the control module 1320 may receive the fixed-rate clock signal Fxd_Clk. In addition, the control module 1320 may receive the sender control signal CS_Sender from the sender masking control signal generator 1310. Depending on its level, the sender control signal CS_Sender may indicate which pulses of the fixed-rate clock signal Fxd_Clk correspond to pulses of the sender variable-rate clock signal Var_Clk Sender. In turn, the control module 1320 may determine on which pulses of the fixed-rate clock signal Fxd_Clk that the sender processing circuit block 1304 wants to present new data to the data input 1322, provided it has new data to present. As shown in FIG. 13, the sender processing block 1304 may be configured to send a send valid signal, identified in FIG. 13 as "Send_Valid," to the control module 1320 to indicate whether the sender processing circuit block has new data to send to the data input 1322. If the sender processing circuit block 1304 has new data to send or present, then the send valid signal may indicate as such, and the sender processing circuit block 1304 may want to present the new data to the data input 1322 on each new or next arriving pulse of the sender variable-rate clock signal Var_Clk Sender.

In addition, the control module 1320 may receive the receiver control signal CS_Receiver from the receiver masking control signal generator 1314. Depending on its level, the receiver control signal CS_Receiver may indicate which pulses of the fixed-rate clock signal Fxd_Clk correspond to pulses of the receiver variable-rate clock signal Var_Clk_Receiver. In turn, the control module 1320 may determine on which pulses of the fixed-rate clock signal Fxd_Clk that the receiver processing circuit block 1306 took or retained the receiver data that the multiplexer 1316 provided on its output to the receiver processing circuit block 1306, provided that the receiver processing circuit block 1306 was ready to retain the receiver data. As shown in FIG. 13, the receiver processing circuit block 1306 may be configured to send a receiver ready signal, identified in FIG. 13 as "Rcv_Ready," to the control module 1320 to indicate whether the receiver processing circuit block 1306 is ready to accept new data. If the receiver processing circuit block 1306 is ready to accept or retain new data, then the receiver ready signal may indicate as such, and the receiver processing circuit block 1306 may want to accept or retain the new data on each new or next arriving pulse of the receiver variable-rate clock signal Var_Clk_Receiver.

As shown in FIG. 13, the control module 1320 may be configured to send a send ready signal, identified in FIG. 13 as "Send_Ready," to the sender processing circuit block 1304 that indicates whether the sporachronous synchronizer 1302 is ready for sender processing circuit block to present new data and/or that the sender processing circuit block 1304 can present new data if it has new data to present. In general, the control module 1320 may send the send ready signal to indicate that the sender processing circuit block 1304 can present new data unless the control module 1320 identifies a situation when it does not want the sender processing circuit block 1304 to present new data. One example situation may be where the sender processing circuit block 1304 presents new data to the data input 1322, but the receiver processing circuit block 1306 will not accept the data at the time the sender processing circuit block 1304 presents the new data. This situation may occur when the receiver processing circuit block 1306 is not able to accept the data at that time (as indicated by the receiver ready signal), or when the next pulse of the receiver variable-rate clock signal Var_Clk_Receiver occurs after the sender variable-rate clock signal Var_Clk Sender. As such, the control module 1320 may want the new data presented by the sender processing circuit block 1304 stored in the register 1318 and make that data available on the output of the multiplexer 1316 for when the receiver processing circuit block 1306 is next able to accept the data. Additionally, the control module 1320 may not want the sender processing circuit block 1304 to present further new data to the data input 1322 until the receiver processing circuit block 1306 has accepted the data stored in the register 1318. As such, the control module 1320 may set the send ready signal at a level that indicates to the sender processing circuit block 1304 that it does not want the sender processing circuit block 1304 to present any further new data.

If the sender processing circuit block 1304 has new data to present and a next pulse of the sender variable-rate clock signal Var_Clk_Sender is arriving, the sender processing circuit block 1304 may or may not present the new data depending on the level of the send ready signal. If the level indicates that the sender processing circuit block 1304 can present new data, then the sender processing circuit block 1304 may present the new data on the next arriving pulse of the sender variable-rate clock signal Var_Clk Sender. Alternatively, if the level indicates that the control module 1320 does not want the sender processing circuit block 1304 to present new data, then the sender processing circuit block 1304 may refrain from presenting the new data when the next pulse of the sender variable-rate clock signal Var_Clk_Sender arrives.

In addition, as shown in FIG. 13, the control module 1320 may be configured to send a receive valid signal, identified in FIG. 13 as "Rcv_Valid," to the receiver processing circuit block 1306. The receive valid signal may indicate whether the receiver data that the multiplexer 1316 is presenting to the receiver processing circuit block 1306 is new data to the receiver processing circuit block 1306. For example, if the receiver processing circuit block 1306 accepts or retains receiver data being output by the multiplexer 1316, that data that is being output by the multiplexer 1316 then is no longer new to the receiver processing circuit block 1306. Accordingly, if the receiver processing circuit block 1306 has not yet accepted or retained the receiver data being output by the multiplexer 1316, the control module 1320 may output the receive valid signal at a level to indicate that the receiver data is new and that the receiver processing circuit block 1306 should accept the data when it is able to. Alternatively, if the receiver processing circuit block 1306 has accepted the receiver data being output by the multiplexer 1316, then the control module 1320 may output the receive valid signal at a level that indicates that the data is old and that the receiver processing circuit block 1306 should not accept that data if it is able to. However, when the multiplexer 1316 begins presenting new or different receiver data, the control module 1320 may change the level of the receive valid signal to again indicate that the receiver is data is new data.

The control module may use the send valid signal, the sender control signal, the receiver ready signal, and the receiver control signal to determine whether to send the send ready signal and the receiver ready signal. For example, the levels of the receiver ready signal and the receiver control signal may indicate that the receiver processing circuit block 1306 has accepted the receiver data being presented at the output of the multiplexer 1316 and is ready to accept new data. The control module 1320 may detect such an indication from the receiver processing circuit block 1306 based on these levels, and in response, output the send ready signal to indicate that the sender processing circuit block 1304 can present new data. Alternatively, based on the levels of the receiver ready signal or the receiver control signal level, the control module 1320 may detect that the receiver processing circuit block 1306 has not accepted the data that is currently being presented at the output of the multiplexer 1306, and in response, may output the send ready signal to prevent the sender processing circuit block 1304 from presenting new data.

Additionally, as described in further detail below, if the receiver processing circuit block 1306 accepts the receiver data and the multiplexer 1316 begins presenting new data, the control module 1320 may not automatically output the receive valid signal to indicate that the multiplexer 1316 is presenting new data. Instead, the control module 1320 may first detect whether the sender control signal CS_Sender is at a level indicating that a next pulse of the sender variable-rate clock signal Var_Clk_Sender will occur at the time of the next pulse of the fixed-rate clock signal Fxd_Clk. The control module 1320 may treat that level as qualifying the data that is currently being presented at the output of the multiplexer 1316 as new data for the receiver processing circuit module 1306 to accept. In turn, the control module 1320 may output the receive valid signal at a level to indicate that the data being presented by the multiplexer 1316 is new data. Alternatively, even if the control module 1320 configures the multiplexer 1316 to output new data, if the sender control signal CS_Sender does not indicate the occurrence of a next pulse of the sender variable-rate clock signal Var_Clk_Sender, the control module 1320 may keep the receive valid signal at a level indicating that the data being presented is not new.

Additionally, when the control module 1320 configures the multiplexer 1316 to output the register data instead of the sender data, the control module 1320 may set the receive ready signal at a level to indicate that that receiver data is new (i.e., that the receiver processing circuit block 1306 has not yet taken that data). In other words, when control module 1320 has the multiplexer output the register data instead of the sender data, the control module 1320 may not use the sender control signal CS_Sender to determine at what level to set the receive valid signal.

As previously mentioned, the control module 1320 may want to have the sender data stored in the register 1318 in case the receiver processing circuit block 1306 is not able to accept it at and/or during the time that the sender processing block 1304 determines to present it. To do so, the control module 1320 may be configured to send a register enable, identified in FIG. 13 as "Reg_en," to the register 1318. As shown in FIG. 13, the register 1318 may also be configured to receive the sender data and the sender variable-rate clock signal Var_Clk Sender. If the control module 1320 wants the register 1318 to store the sender data that the sender processing block 1304 is presenting, the control module 1320 may send the register enable signal at a first level, such as a high level, which may cause the register 1318 to retain the sender data on the next pulse of the sender variable-rate clock signal Var_Clk Sender. Alternatively, if the control module 1320 does not want the register 1318 to store the sender data, then the control module 1320 may send the register enable signal at a second level, such as a low level, which may cause the register 1318 to ignore the sender data and the pulses of the sender variable-rate clock Var_Clk Sender. For some example configurations, the control module 1320 may want the register 1318 to store the sender data at the time that the sender processing circuit block 1304 presents new data as the sender data, which the sender processing circuit block 1304 may indicate to the control module 1320 by the levels of the send valid signal and the sender control signal. Accordingly, when the send valid signal indicates that the sender processing circuit block has valid data to present and the sender control signal is at a level indicating that the pulses of the fixed-rate clock signal are not being masked—i.e., the sender processing circuit block 1304 has a clock pulse on which to present the new data—the control module 1320 may send the register enable signal at the first level to cause the register 1318 to start storing the old data when the sender processing circuit block starts presenting the new data (old data meaning the sender data that the sender processing circuit block 1304 was presenting immediately prior to presenting the new data).

Figure 14:
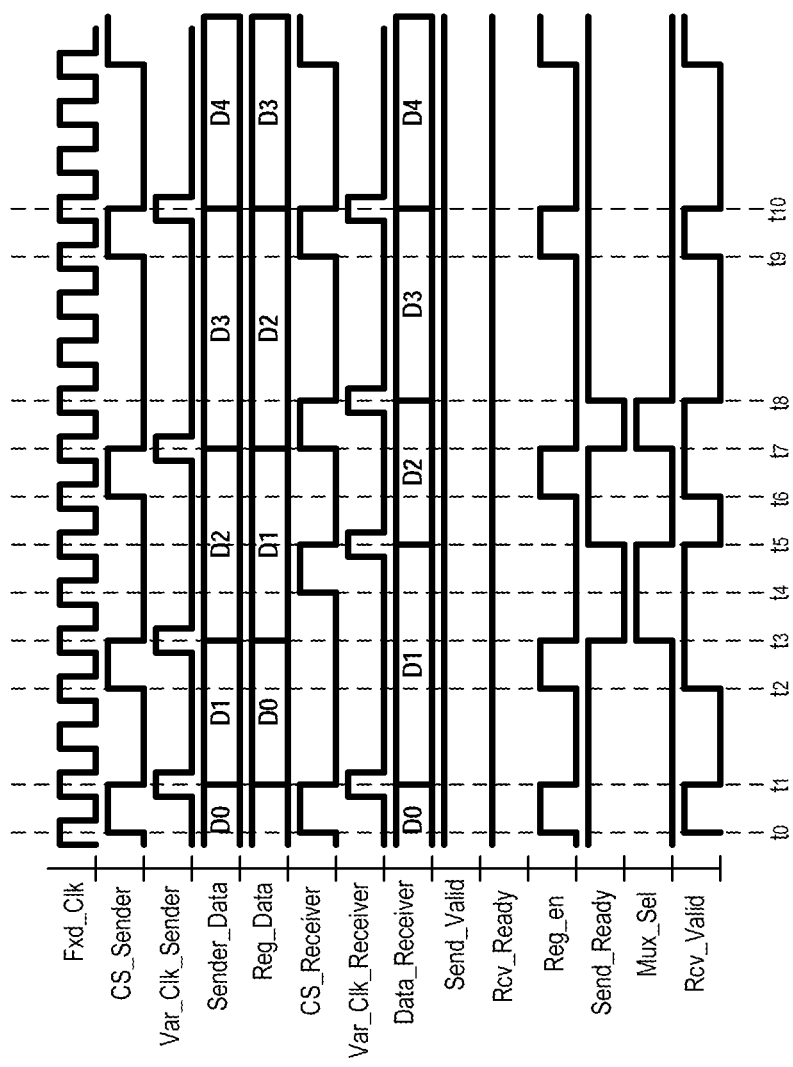
FIG. 14 is a timing diagram of various signals associated with the sporachronous synchronizer of FIG. 13.

FIG. 14 shows a timing diagram of example waveforms of the various signals that may be communicated between the sporachronous synchronizer 1302, the sender processing circuit block 1304, and the receiver processing circuit block 1306. FIG. 14 shows the sender processing circuit block presenting different data sets D0, D1, D2, D3, D4, D5, and D6 during different points in time. In addition, the timing diagram assumes that the sender processing circuit block 1304 always has new a new data set to send, and so the send valid signal is always high in FIG. 14. Similarly, the timing diagram assumes that the receiver processing circuit block 1306 is always ready to receive new data after it accepts the receiver data being presented by the multiplexer 1316, and so the receiver ready signal is always high in FIG. 14.

Also, FIG. 14 shows that a high level of the sender and receiver control signals CS_Sender, CS_Receiver corresponds to the sender and receiver variable-rate clock signals Var_Clk_Sender, Var_Clk_Receiver being generated without masking. Accordingly, the sender control signal CS_Sender being at a high level may indicate to the control module 1320 that a next pulse of the sender variable-rate control signal Var_Clk_Sender will occur when the next pulse of the fixed-rate clock signal Fxd_Clk occurs. Similarly, the receiver control signal CS_Receiver being at a high level may indicate to the control module 1320 that a next pulse of the receiver variable-rate control signal Var_Clk_Receiver will occur when the next pulse of the fixed-rate clock signal Fxd_Clk occurs. Alternatively, a low level of the sender and receiver control signals CS_Sender, CS_Receiver corresponds to the sender and receiver variable-rate clock signals Var_Clk_Sender, Var_Clk_Receiver being generated with masking. Accordingly, the sender control signal CS_Sender being at a low level may indicate to the control module 1320 that a next pulse of the sender variable-rate control signal Var_Clk_Sender will not occur when the next pulse of the fixed-rate clock signal Fxd_Clk occurs. Similarly, the receiver control signal CS_Receiver being at a low level may indicate to the control module 1320 that a next pulse of the receiver variable-rate control signal Var_Clk_Receiver will not occur when the next pulse of the fixed-rate clock signal Fxd_Clk occurs.

At an initial time $t_0$, the sender processing circuit block 1304 is presenting data set D0 to the data input 1322. The Reg_Data line in FIG. 14 is blank at time $t_0$, indicating that the register 1318 is not storing any data at time $t_0$. The control module 1320 is asserting the multiplexer control signal at a low level, and so data set D0 is being passed through the multiplexer 1316 and presented at the output of the multiplexer 1316 as the receiver data. Also, the control module 1320 is asserting the send ready signal at a high level to indicate that the sender processing circuit block 1304 can send new data—i.e., data set D1. At time $t_0$, the receiver processing circuit block 1306 has not yet accepted or retained data set D0. However, since the register 1318 is empty, the register 1318 can store D0 for the receiver processing circuit block 1306 should it not be able to accept data set D0 by the time that the sender processing circuit block presents new data set D1.

Also, at time $t_0$, the sender control signal CS_Sender transitions to a high level, indicating to the control module 1320 that a pulse of the sender variable-rate clock signal Var_Clk_Sender will occur at the next fixed-rate clock signal Fxd_Clk. The control module 1320 may detect the high level, and also detect that the send valid signal is high. In response, the control module 1320 may determine that the sender processing block 1304 will send new data set D1 on the next pulse of the variable-rate clock signal Var_Clk Sender. Accordingly, the control module 1320 may transition the register enable signal to a high level to indicate to the register 1318 to retain the current data set D0 on the next pulse of the sender variable-rate clock signal Var_Clk_Sender when the sender processing circuit block 1304 presents new data set D1.

The sender control signal CS_Sender may also have another function. When high, the sender control signal CS_Sender may also qualify the data that it is currently presenting, which is data set D0 at time $t_0$. As mentioned, at time $t_0$, the receiver processing circuit block 1306 has not yet accepted or retained data set D0. The control module 1320 may detect the low-to-high transition of the sender control signal CS_Sender and in response, transition the receive valid signal high to indicate to the receiver processing circuit block 1306 that data set D0 is new data for the receiver processing circuit block 1306 to accept.

Also, at time $t_0$, the receiver control signal CS_Receiver may also transition high, indicating that a pulse of the variable-rate clock signal Var_Clk_Receiver will also occur at the next pulse of the fixed-rate clock signal Fxd_Clk.

At time $t_1$, a pulse of the sender variable-rate clock signal Var_Clk_Sender may occur. As shown in FIG. 14, the sender processing circuit block 1304 may present data set D1 to the data input 1322. Since the register enable signal was high prior to time $t_1$, then the register 1318 may store prior data set D0. Also, at time $t_1$, a pulse of the receiver variable-rate clock signal Var_Clk occurs. The receiver processing circuit block 1306 may accept data set D0 on that pulse since the control module 1320 asserted the receive valid signal high. Since the receiver processing circuit block 1306 accepted data set D0, then the control module 1320 may want the receiver processing circuit block 1306 to next accept data set D1 that the sender processing circuit block 1304 is now presenting at the next rising edge of the receiver variable-rate clock signal Var_Clk_Receiver. Accordingly, the control module 1302 may keep the multiplexer control signal low so that the multiplexer 1316 presents the new data set D1 instead of the old data set D0 that is now being stored in the register 1318. In addition, the control module 1320 may keep send ready high to indicate that the sender processing circuit block 1304 can send new data since if the receiver processing circuit block 1306 has not accepted data set D1 by the time that the sender processing circuit block 1304 wants to present the new data, the control module 1320 can have the currently-presented data set D1 stored in the register 1318 and have the multiplexer 1316 present data set D1 to the receiver processing circuit block 1306 while the sender processing circuit block 1304 presents the new data set D2.

Also, in the example shown in FIG. 14, around time $t_1$ before the next pulse of the fixed-rate clock signal Fxd_Clk occurs, both the sender control signal CS_Sender and the receiver control signal CS_Receiver transition low, indicating that neither the sender variable-rate clock signal Var_Clk_Sender nor the receiver variable-rate clock signal Var_Clk_Sender will have a pulse that occurs when the next pulse of the fixed-rate clock signal occurs. Knowing that the sender processing circuit block 1304 will not present new data at the next pulse of the fixed-rate clock signal Fxd_Clk, the control module 1320 transitions the register enable signal low. Also, because the sender control signal CS_Sender transitioned low, the CS_Sender will not qualify the data set D1 being presented at the output of the multiplexer 1316 for the receiver processing circuit block 1306 to accept. In response, the control module 1320 may assert the receive valid signal low.

At time $t_2$, the sender control signal CS_Sender transitions high to indicate that a pulse of the sender variable-rate clock signal Var_Clk_Sender will occur on the next pulse of the fixed-rate clock signal Fxd_Clk. Accordingly, the control module 1320 may transition the register enable signal high so that the register 1318 retains the currently-presented data set D1 on the next pulse of the sender variable-rate clock signal Var_Clk Sender. In addition, the control module 1320 may transition the receive valid signal to qualify data set D1 being presented on the output of the multiplexer 1316 as new data for the receiver processing circuit block 1306 to accept since the sender control signal CS transitioned high. However, at time $t_2$, the receiver control signal CS_Receiver has not yet transitioned high, indicating that the receiver processing circuit block 1306 will not accept the data set D1 being presented at the output of the multiplexer 1316 at the next pulse of the fixed-rate clock signal Fxd_Clk.

At time $t_3$, the next pulse of the sender variable-rate clock signal Var_Clk_Sender may occur, coinciding with the occurrence of the next pulse of the fixed-rate clock signal Fxd_Clk after the sender control signal CS_Sender transitioned high. In response, the sender processing circuit block 1304 may begin presenting new data set D2, and the previously-presented data set D1 may be stored in the register 1318.

Also, at time $t_3$, since the receiver processing circuit block 1306 did not accept data set D1, the control module 1320 may want to keep data set D1 available for the receiver processing circuit block 1306 to accept. As such, at time $t_3$, the control module 1320 may transition high the level of the multiplexer control signal so that data set D1 now stored in the register 1318 continues to be presented to the receiver processing circuit block 1306.

Since at time $t_3$ the control module 1320 is having the multiplexer 1320 present data set D1 stored in the register 1318 instead of data set D2 that the sender processing circuit block 1304 is currently presenting, the control module 1320 may not want the sender processing circuit block to present new data—i.e., data set D3—until the receiver processing circuit block 1306 accepts data set D1 stored in the register 1318. In other words, the control module 1320 may not allow the sender processing circuit block 1304 to present new data two or more times before the receiver processing circuit block accepts any data sets. Or still otherwise stated, the control module 1320 may only allow the sender processing circuit block 1304 to present new data once before the receiver processing circuit block 1306 accepts the receiver data being presented by the multiplexer 1316. As such, at time $t_3$, the control module 1320 may output the send ready signal to a low level to prevent the sender processing circuit block from presenting new data.

In addition, around time $t_3$ before the next pulse of the fixed-rate clock cycle, the sender control signal CS_Sender may transition low, which may control module 1320 to transition the register enable signal low. In addition, even though the sender control signal transitioned, because control module 1320 transitioned the multiplexer control signal high so that the register data is presented at the output of the multiplexer 1320, control module 1320 may determine to keep the receive valid signal at time t3 high so that the receiver processing circuit block 1306 accepts the receiver data at the output of the multiplexer 1316 when it is able to.

At time $t_4$, the receiver control signal CS_Receiver may transition high, indicating that a next pulse of the receiver variable-rate clock signal will occur when the next pulse of the fixed-rate clock signal occurs. In addition, since the receive ready signal is high, the receiver control signal CS_Receiver transitioning high may indicate to the control module 1320 that the receiver processing circuit block 1306 will accept data set D1 being presented at the output of the multiplexer 1316 at the next pulse of the fixed-rate clock signal Fxd_Clk.

At time $t_5$, the next pulse of the receiver variable-rate clock signal Var_Clk_Receiver may occur, coinciding with the next pulse of the fixed-rate clock signal Fxd_Clk. As such, the receiver processing circuit block may accept data set D1 being presented at the output of the multiplexer 1316.

Once the receiver processing circuit blocks accepts data set D1, the control module 1320 may want to make a new data set available for the receiver processing circuit block 1306 to accept, which is data set D2 that the sender processing circuit block 1304 is currently presenting. As such, the control module 1320 may transition the multiplexer control signal back low so that the multiplexer 1316 outputs data set D2 currently being presented by the sender processing circuit block 1304 instead of data set D1 still being stored in the register 1318. However, since at time $t_5$, the sender control signal CS_Sender is not high to qualify data set D2, the control module 1320 may transition the receive valid signal low.

In addition, since the receiver processing circuit block 1306 accepted data set D1, then the control module 1320 may allow the sender processing circuit block 1304 to present new data. Accordingly, at time $t_5$, the control module 1320 may transition the send ready signal back to the high level.

At time $t_6$, the sender control signal CS_Sender may transition high, indicating that the next pulse of the sender variable-rate clock signal Var_Clk_Sender will coincide with the next pulse of the fixed-rate clock signal Fxd_Clk, and that the sender processing circuit block will present new data—i.e., data set D3—on that next pulse. Accordingly, the control module 1320 transitions the register enable signal high as well as the receive valid signal to qualify data set D2 currently presented at the output of the multiplexer 1316 as new data for the receiver processing circuit to accept. At time $t_6$, however, the receiver control signal CS_Receiver remains low, similar to what occurred at time $t_2$.

At time $t_7$, the next pulse of the sender variable-rate clock signal Var_Clk_Sender occurs, coinciding with the next pulse of the fixed-rate clock signal Fxd_Clk. As such, the sender processing circuit block 1304 presents new data set D3, and the previously-presented data set D2 is stored in the register 1318. Since the receiver processing circuit block 1306 did not accept data set D2 at time $t_7$, the control module 1320 may switch the multiplexer control signal back high so that the multiplexer 1316 is still presenting data set D2 to the receiver processing circuit block 1306. The control module 1306 may keep the receive valid signal high since the multiplexer is outputting the data set D2 stored in the register 1318. Also, the control module 1320 may transition the send ready signal low in case the sender processing circuit block 1304 wants to present any further new data.

In addition, around time $t_7$ (i.e., before the next pulse of the fixed-rate clock signal Fxd_Clk), the sender control signal CS_Sender transitions low, indicating that a pulse of the variable-rate clock signal Var_Clk_Sender will not occur when the next pulse of the fixed-rate clock signal Fxd_Clk occurs. Accordingly, the control module 1320 transitions the register enable signal low. Also around time $t_7$ before the next pulse of the fixed-rate clock signal Fxd_Clk occurs, the receiver control signal CS_Receiver transitions high, indicating that the next pulse of the receiver variable-rate clock signal Var_Clk_Receiver will occur when the next pulse of the fixed-rate clock signal Fxd_Clk does.

At time $t_8$, the next pulse of the receiver variable-rate clock signal Var_Clk_Receiver occurs when the next pulse of the fixed-rate clock signal occurs. As such, the receiver processing circuit block 1306 accepts D2. The control module 1320 then transitions the multiplexer control signal low so that the output of the multiplexer 1316 is presenting data set D3 currently being presented by the sender processing circuit block 1304 instead of the data set D2 still being stored in the register 1318. The control module 1320 also transitions the send ready signal back high to indicate that the sender processing circuit block 1304 can present new data. However, the control module 1320 may transition the receive valid signal low even though data set D3 is data that the receives processing circuit block 1306 has not yet accepted because the sender control signal CS_Sender is low.

At time $t_9$, both the sender and the receiver control signals CS_Sender, CS_Receiver transition high, indicating that both the next pulse of the sender variable-rate clock signal Var_Clk_Sender and the next pulse of the receiver variable-rate clock signal Var_Clk_Sender will occur when the next pulse of the fixed-rate clock signal occurs. In response to the sender control signal transitioning high, the control module 1320 may transition the register enable signal high as well as the receive valid signal.

At time $t_{10}$, the sender processing circuit block will start presenting new data set D4, and previously-presented data set D3 will be stored in the register 1318. Also, since the receiver processing circuit block 1306 was able to accept data set D3 at time $t_{10}$, then the control module 1320 may keep the multiplexer control signal low so that the multiplexer 1316 presents data set D4 to the receiver processing circuit block 1306. Also, at around time $t_{10}$, the sender control signal CS_Sender transitions low, and so the control module 1320 transitions the receive valid signal low.

The control module 1320 may be configured to assert the send ready, receive valid, multiplexer control signal, and the register enable signals to high and low levels according to the following logic equations:

Send_Ready=1 if (Rcv_Ready=1 AND CS_Sender=1) OR Mux_Sel=0;

Rcv_Valid=1 if (Send_Valid=1 AND CS_Sender=1) OR Mux_Sel=1; Mux_Sel=1 if (Send_Valid=1 AND CS_Sender=1) AND NOT(Rcv_Ready=1 AND CS_Receiver=1);

Mux_Sel=0 if (Rcv_Ready=1 AND CS_Receiver=1) AND NOT(Send_Valid=1 AND CS_Sender=1);

Reg_en=1 if (Send_Valid=1 AND CS_Sender=1).

The pipeline system 100 shown in FIG. 1, the various masking circuitry configurations for generation of the variable-rate clock signals described with reference to FIGS. 2-10, and the sporachronous synchronizer described with references to FIGS. 13 and 14 describe various ways that sporachronous variable-rate clock signals may be used to operate processing circuit blocks in a pipeline in different sporachronous clock domains. Use of sporachronous clock signals rather than asynchronous clock signals may be advantageous in that less latency may be experienced when passing data or other signals between sporachronous clock domains instead of asynchronous clock domains. In addition, use of a single register to pass data between asynchronous clock domains may be subject to metastability, a phenomenon in which setup and hold times associated with a register are not met, which in turn may result in a failure of the register to pass data reliably. In order to reduce the failure rate to an acceptable level when passing data between asynchronous clock domains, a synchronizer with a rank of two or greater (e.g., dual-rank, triple-rank, etc.) may be used. The number of the rank may correspond to or identify the number of registers or the level of registers in the synchronizer that a signal passes through before the signal may be sent to the receiver processing circuit block. The larger the number of registers or level of registers, the greater the number cycles of the receiver clock signal that may be needed to communicate the data from the first asynchronous clock domain to the second, which in turn may cause a larger amount of delay or latency to communicate the data. In contrast, the sporachronous synchronizer 1302 may include a single register 1318 (or single level of registers) to pass data between sporachronous clock domains while guaranteeing that setup and hold times are always met, and therefore metastability is not a risk. As a result, the minimum latency of a sporachronous synchronizer to communicate data between sporachronous clock domains is less than one clock cycle of the fixed-rate clock signal Fxd_Clk, whereas the minimum latency of a synchronizer having a rank of two or greater to communicate data between asynchronous clock domains is a minimum of two clock cycles of the receiver clock signal.

In addition to being sporachronous, the variable-rate clock rates generated using masking may allow for their rates to be adjusted in linearly-spaced increments and decrements, as previously described. The ability to linearly adjust clock rates between a minimum rate and a maximum rate may provide for finer granularity of rate adjustment and a larger selection of different desirable rates to select from in order to adjust a clock signal. These advantageous features may not be available for other variable-rate clock generators, such as those that change a rate of a clock signal by changing a denominator component of a fraction while keeping the numerator component constant. Further, the variable-rate clock generators described herein may perform clock adjustment "on the fly" or in real time using simple hardware circuitry including adders, subtractors, comparators, multiplexers, and registers, as opposed to more complex circuits such as those implementing phase locked loops, or processors executing software or firmware. The ability to vary or adjust a clock signal in linearly-spaced increments and decrements in real-time using hardware circuits may be advantageous for those reasons, even if the different variable-rate clock signals that are generated are not also sporachronous.

Figure 15:
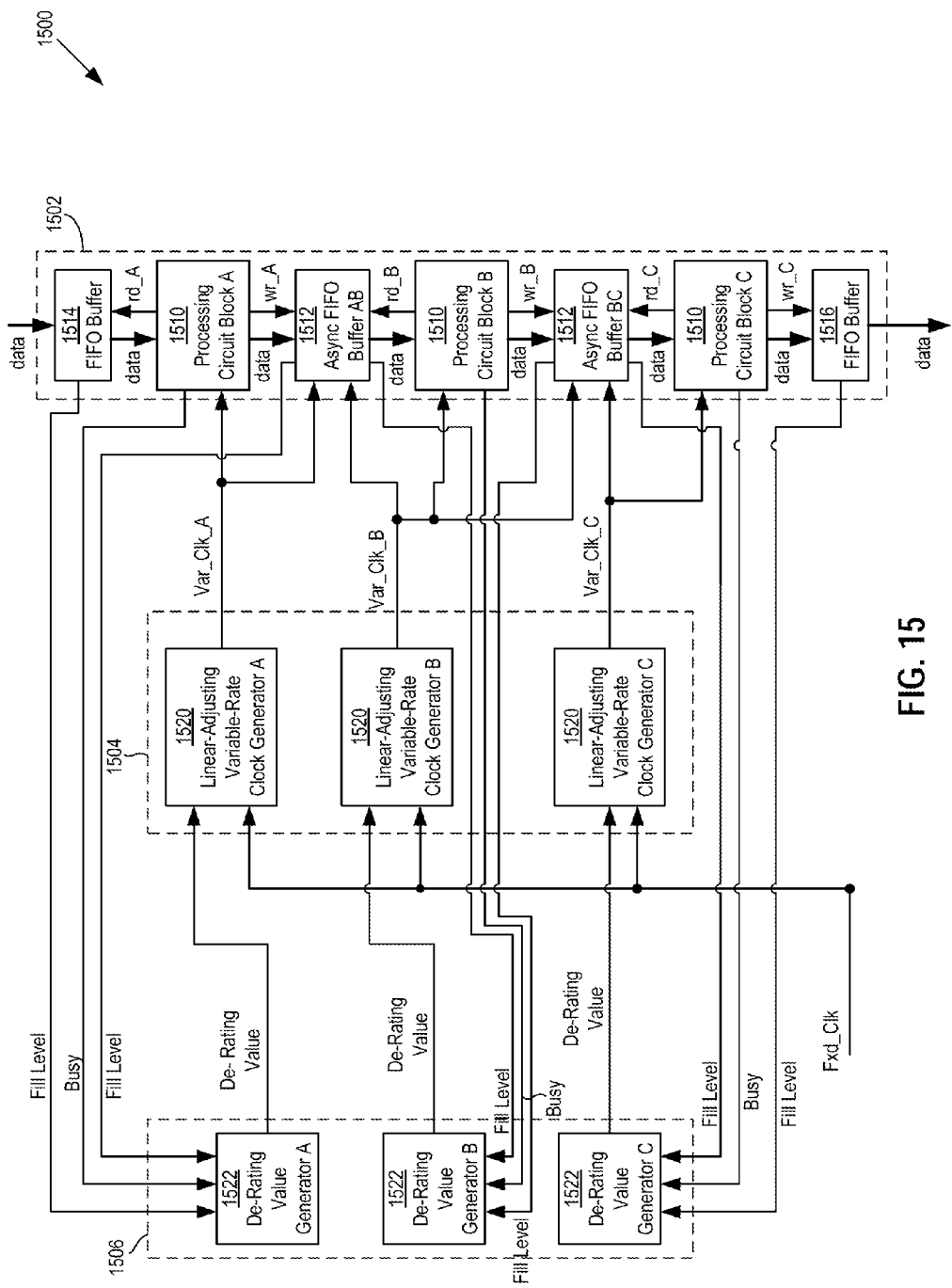
FIG. 15 is a block diagram of another example pipeline system.

FIG. 15 shows a block diagram of another example pipeline system 1500 that may include a pipeline 1502, variable-rate clock generation circuitry 1504, and de-rating value circuitry 1506. The pipeline 1502 may be similar to the pipeline 102 of FIG. 1 in that the pipeline 1502 may include a plurality of processing circuit blocks 1510 each configured to perform a function in the pipeline 1502, and in a main data flow of the pipeline, receive data from an upstream processing circuit block 1510 and send data it processes to a downstream processing circuit block 1510. In addition, the de-rating value generation circuitry 1506 may be similar to the de-rating value generation circuitry 106 of FIG. 1 in that the de-rating value circuitry 1506 may include a plurality of de-rating value generators 1522 configured to generate de-rating values to set and/or adjust rates of variable-rate clock signals generated by the variable-rate clock generation circuitry 1504. In addition, as with the pipeline system 100 of FIG. 1, the plurality of de-rating value generators 1522 may receive busy status and fill level information from the processing circuit blocks 1510 and their associated input and output FIFO buffers 1512, 1514, 1516. The de-rating values may be generated based on the busy status and fill level information according to the chart shown in FIG. 13, as previously described.

The variable-rate clock generation circuitry 1504 may include a plurality of linear-adjusting variable-rate clock generators 1520, each configured to generate and one of a plurality of variable-rate clocks to an associated processing circuit block 1510. Each linear-adjusting variable-rate clock generator may be configured to receive a de-rating value from an associated one of the de-rating value generators 1522. One way to consider the association is that the linear-adjusting variable-rate clock generator 1522 receives a de-rating value from a de-rating value generator that receives busy status information from the processing circuit block 1510 that the linear-adjusting variable-rate clock generator sends its variable-rate clock signal to. In addition to receiving de-rating values, the linear-adjusting variable-rate clock generators 1522 may also receive a fixed-rate clock signal Fxd_Clk on which to base generation of the variable-rate clock signals.

Like the variable-rate clock signals generated by the pulse masking circuits 118 of FIG. 1, the linear-adjusting variable-rate clock generators 1522 may generate their respective variable-rate clock signals at rates that are each fractions (M/N) of the rate of the fixed-rate clock signal Fxd_Clk. The numerator values M and/or the denominator values N among the fractions (M/N) of the various variable-rate clock signals may be the same or different from each other, depending on the de-rating values that are generated. In addition, for a constant denominator value N, the rates of each of the variable-rate clock signals may be adjusted linearly in evenly spaced increments and decrements.

However, the variable-rate clock signals generated by the linear-adjusting variable-rate clock generators 1520 may not be sporachronous signals in the strict sense in that depending on the de-rating value used, a rising edge of the variable-rate clock signal may not be edge-aligned with a rising edge of the fixed-rate clock signal and/or a falling edge of the variable-rate clock signal may not be edge-aligned with a falling edge of the fixed-rate clock signal. As such, communication across clock domains between the different processing circuit blocks may be treated asynchronously. As shown in FIG. 15, the FIFO buffer in between consecutive processing circuit blocks 1510 in the pipeline 1502 may be of the asynchronous type (i.e., synchronous FIFO buffers may not be used). In addition, the sporachronous synchronizer circuitry 108 of FIG. 1 and 1402 of FIG. 14 may not be used to communicate data between processing circuit blocks 1510 outside of the main data flow. Such communication may be performed using asynchronous circuitry, which is considered outside the scope of the present application.

In addition, the linear-adjusting variable-rate clock generators 1520 may not generate their variable-rate clock signals by masking pulses, as with the pulse masking circuits 118 of FIG. 1. Instead, the generators 1520 may generate the variable-rate clock signals by generating high and low levels to form an M-number of pulses over an N-number pulses of the fixed-rate clock signal Fxd_Clk according to the fraction (M/N). The numerator value M may be determined by the de-rating value itself, and denominator value N may be determined by a size m of an m-bit register used to generate the variable-rate clock signal, as described in further detail below with respect to FIG. 16.

Figures 16, 17:
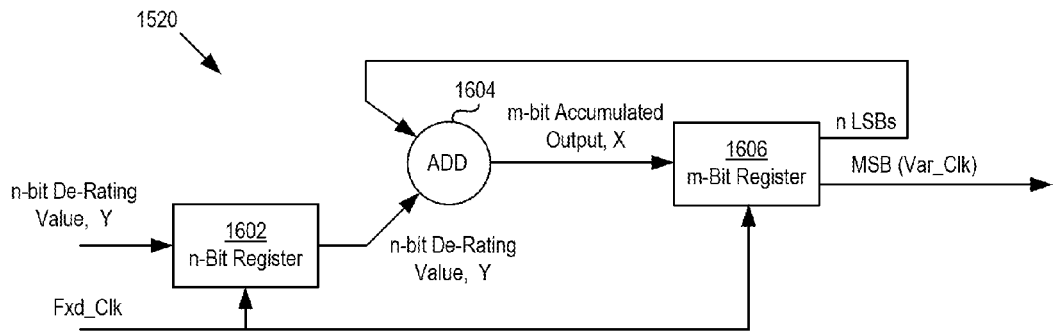
FIG. 16 is a block diagram of an example configuration of a variable-rate clock generation circuit.
FIG. 17 is a FIG. 7 is a chart illustrating input and output values generated during clock cycles of an example operation of the variable-rate clock generation circuit of FIG. 16.

FIG. 16 shows the linear-adjusting variable-rate clock generator 1520 in further detail. The linear-adjusting variable-rate clock generator 1520 may include an n-bit register 1602, an adder circuit 1604, and an m-bit register 1606. Each of the n-bit register 1602 and the m-bit register 1606 may be configured to receive the fixed-rate clock signal Fxd_Clk and output their respective outputs on each pulse of the fixed-rate clock signal. In addition, the n-bit register 1602 may be configured to receive an n-bit binary de-rating value, Y, such as from one of the de-rating value generators 1522. For the linear-adjusting variable-rate clock generator 1520, the value Y may equal the numerator component M of the fraction (M/N). A maximum value for the de-rating value Y may be $2^{(n-1)}$. The denominator value N of the fraction (M/N) may be equal to $2^m$. So, for example, if the size or number of bits of the m-bit register 1606 is four, then N is sixteen.

On each clock pulse of the fixed-rate clock signal Fxd_Clk, the n-bit register 1602 may send the n-bit de-rating value Y to a first input of the adder circuit 1604. The m-bit register 1606 may be configured to feed back to a second input of the adder circuit 1604 an n-number of least significant bits (LSBs) of an m-bit accumulated output X, which may be the sum of the n-bit de-rating value Y and the n-number of least significant bits output by the m-bit register 1606. The m-bit register 1606 may also be configured to output the most significant bit (MSB) of the m-bit value stored in the register 1606 as the variable-rate clock signal. The m-bit register 1606 may feed back the n-number of least significant bits to the second input of the adder circuit 1604 and output a most significant bit of the m-bit value stored in the register 1606 as the level of the variable-rate clock signal on every pulse of the fixed-rate clock signal Fxd_Clk.

The rate of the fixed-rate clock signal may be a multiple G of the maximum rate of the variable-rate clock frequency, where the multiple G is a power of two (i.e., $G=2^n$, where n is an integer greater than zero. So, for example, G=2, 4, 8, 16, etc.) Otherwise stated, the maximum rate of the variable-rate clock signal may be one-Gth the rate of the fixed-rate clock signal. The size of the m-bit register 1606 (the value for m) may depend on the n-number of bits of the de-rating value Y and the multiple G of the maximum rate of the variable-rate clock frequency. In particular, the m-number of bits may be mathematically determined by the following equation:

$$m=n+[\log_2(G)-1].$$

FIG. 17 is a table illustrating operation of the linear-adjusting variable-rate clock generator 1520. In the example operation, the m-bit Register is four bits in size, which yields a denominator value of sixteen (i.e., $2^4=16$). Accordingly, the clock rate for the variable-rate clock signal may be set and/or adjusted in one-sixteenth increments. In the example, the de-rating value itself is five ("0101" in binary.), which yields a fraction of 5/16, or a clock rate that is 5/16 (31.25%) that of the rate of the fixed-rate clock signal Fxd_Clk.

Also, in the example shown in the table of FIG. 17, the rate of the fixed-rate clock signal is two-times the maximum rate of the variable-rate clock signal (i.e., G=2). Accordingly, the size of the m-bit register 1606 is four-bits (i.e., m=n). Since in this example the m-bit accumulated output X is a four-bit number, then the entire four-bit number stored in the m-bit register 1406 is fed back to the adder circuit 1604. Also shown in the table in FIG. 17 is the MSB of the 4-bit number—i.e., the level of the variable-rate clock signal.

The table shown in FIG. 17 identifies the low-to-high transitions of the MSB when the value of the MSB changes from logic 0 to logic 1, and the high-to-low transitions of the MSB when the MSB changes from logic 1 to logic 0. A single pulse may be determined to occur after a low-to-high transition followed by a high-to-low transition. Accordingly, the first full pulse does not occur until the fourth clock cycle, identified as "Pulse 1" in the table. As shown in FIG. 17, five pulses, Pulse 1 to Pulse 5, occur in sixteen clock cycles, corresponding to the de-rating value of five.

FIG. 18 shows a chart illustrating the resulting fractions (M/N) and waveforms corresponding to the various possible de-rating values Y for a denominator value of 16. As illustrated in FIG. 18, the rate of the fixed-rate clock signal Fxd_Clk is twice the maximum rate of the variable rate clock signal. Also illustrated in FIG. 18 is that the fractions (M/N) linearly decrease in decrements of one-sixteenth as the de-rating value Y linearly decreases from eight to zero (in increments of one). Accordingly, by changing the de-rating value, the rate of the variable-rate clock signal relative to the fixed-rate clock signal can be adjusted linearly in one-sixteenth increments and decrements, starting at one-half the rate of the fixed-rate clock signal.

As mentioned, the variable-rate clocks generated by the linear-adjusting clock generator 1520 may be not sporachronous in the strict sense since they may not perform high-to-low and low-to-high transitions in alignment with respective high-to-low and low-to-high transitions of the fixed-rate clock signal. However, depending on the application, the linear-adjusting clock generator 1520 may be advantageous in that in comparison to the variable-rate clock signals generated by the masking circuitry in FIG. 1, the waveforms may be more balanced (i.e., they are all high 50% of the time and low 50% of the time), the clock edges may be more evenly spaced, and the duty cycle (the percentage of the total clock cycle that the waveform is high) may be closer to 50%.

The example pipeline systems 100 and 1500 of FIGS. 1 and 15, respectively, are described as being configured to generate variable-rate clock signals that are sent to the processing circuit blocks 110, 1510. The rates of these variable-rate clock signals may be dynamically adjusted during operation of the pipelines in that, as described, changes in the fill levels, busy statuses, and/or operations modes may cause the de-rating value circuitries 106, 1506 to output different de-rating values, which in turn may cause the rates of one or more of the variable-rate clock signals to change. Example pipeline systems other than the ones shown in FIGS. 1 and 15 may include processing circuit blocks that operate in different clock domains, including different sporachronous clock domains, but that do not dynamically adjust the rates of the clock signals, or alternatively do dynamically adjust the rates but based on information or events other than the combinations of the fill level information, busy status information, and operation modes as described herein. One type of other example information may be power information that identifies power being consumed by the pipeline system or one or more circuit components of the pipeline system. Additionally, for example pipeline systems that do not dynamically adjust the rates of the clock signals, the de-rating values that set the rates may be static, fixed, pre-programmed and/or hardwired into the clock generation circuitries. These other example pipeline systems may accordingly use any of the variable-rate clock generation circuitries 104, 1504 described herein, including any of the circuit configurations 300, 600, 900, 1000, 1520 of FIGS. 3, 6, 9, 10, and 16, respectively, in order to generate and supply clock signals to processing circuit blocks of one or more pipelines. Various combination of the circuitries of the example pipeline systems 100 and 1500 described herein may be used for configurations of other example pipeline systems.

Figure 19:
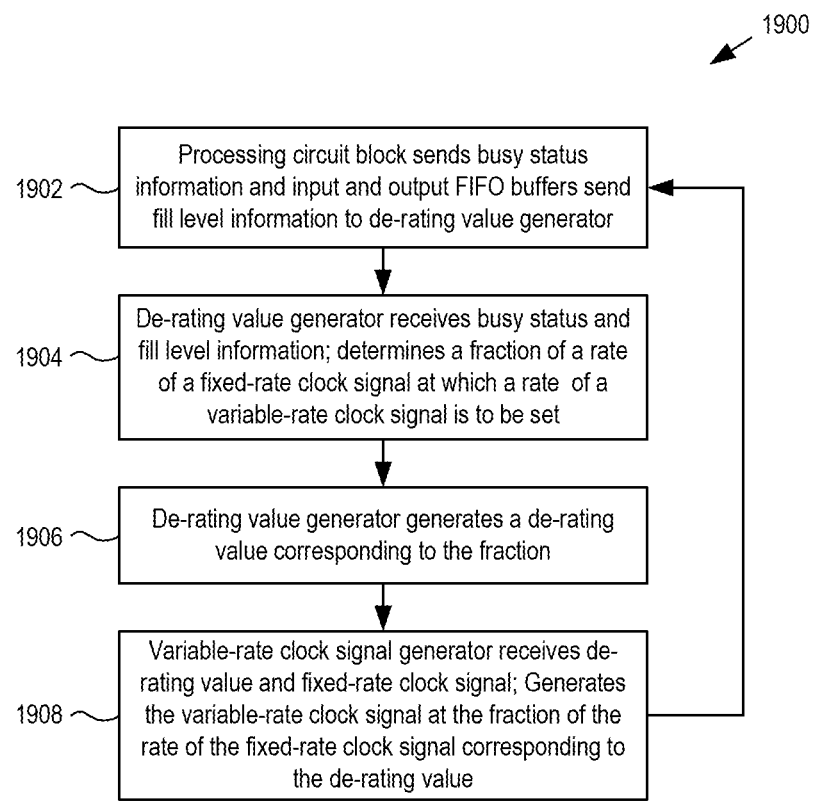
FIG. 19 is a flow chart of an example method of generating a variable-rate clock signal that is sent to a processing circuit block in a pipeline.

FIG. 19 is a flow chart of an example method 1900 of generating a variable-rate clock signal that is sent to a processing circuit block in a pipeline. At block 1902, the processing circuit block configured to process data in a main data flow of the pipeline may send busy status information to a de-rating value generator. The processing circuit block may receive the variable-rate clock signal to process the data. Additionally, an input FIFO buffer and output FIFO buffer associated with the processing circuit block may send respective fill level information to the de-rating value generator.

At block 1904, in response to receiving the busy status and fill level information, the de-rating value generator may identify a fraction of a rate of a fixed-rate clock signal at which it wants the rate of the variable-rate clock signal to be. The fraction may be based on the busy status and fill level information. The fraction may also be based on whether the processing circuit block is operating in a performance mode or a reduced-power mode of operation. In particular, the fraction may be determined in accordance with the chart shown in FIG. 12, as previously described, where the fraction is one of: (1) equal to one so that the rate of the variable-rate clock signal is equal to the rate of the fixed-rate clock signal; (2) one of a plurality of fractions in range, where the fractions in the range linearly decrease from a maximum value to a minimum value; and (3) a fraction corresponding to an idle rate. The idle rate fraction may be one of the fractions, such as a lowest fraction, in the range, or may be a fraction that is not among the plurality of fractions in the range.

At block 1906, the de-rating value generator may generate a de-rating value that corresponds to the fraction that the de-rating value generator identified at block 1904. In addition, the de-rating value generator may output the de-rating value to a variable-rate clock generator to cause the variable-rate clock generator to generate the variable-rate clock signal at the fraction of the rate of the fixed-rate clock signal determined by the de-rating value generator. In some example methods, the de-rating value generator may already be generating a de-rating value and outputting it to the variable-rate clock generator. As long as there is no change in the busy status information, fill level information, or operation mode, the de-rating value generator may continue to generate and output the same de-rating value. Alternatively, if one or more of the busy status information, the fill level information, or the operation mode changes, the de-rating value generator may determine to generate and output a different or new de-rating value from the one it is currently outputting.

At block 1908, the variable-rate clock signal generator may receive the de-rating value and the fixed-rate clock signal. The variable-rate clock signal generator may generate the variable-rate clock signal to have a rate at a fraction of the rate of the fixed-rate clock signal corresponding to the received de-rating value. The variable-rate clock signal generator may send the generated variable-rate clock signal to the processing circuit block in the pipeline. The method 1900 may then proceed back to block 1902, where the processing circuit block sends busy status information and its associated input and output FIFO buffers send fill level information back to the de-rating value generator.

Blocks 1902-1908 of the example method 1900 may be continually and/or repeatedly performed during operation of the processing circuit block in the pipeline. That is, the processing circuit block may continually send busy status information and its associated input and output FIFO buffers may continually send fill level information, such as on pulses of the fixed-rate clock signal, back to the de-rating value generator. The de-rating value generator may continuously output a de-rating value, which may stay the same or change, depending on one or more changes in the busy status information, the fill level information, or the operation mode. The variable-rate clock signal generator may continuously output the variable-rate clock signal to the processing circuit block. The rate of the variable-rate clock signal may depend on the de-rating value that the variable-rate clock signal generator receives. That is, the rate may stay the same as long as the de-rating value stays the same, or may change corresponding to a change in the de-rating value. Changes in the de-rating value may correspond to linear changes in the rate of the variable-rate clock signal. Accordingly, changes in the busy status and/or fill level information may correspond to linear adjustments made to the rate of the variable-rate clock signal, except when the changes in the busy status and/or fill level information determine that the rate of the variable-rate clock signal should be either at 100% the rate of the fixed-rate clock signal or at an idle rate, and that rate does not correspond to one of the fractions that are part of the range of linearly-decreasing fractions.

Figure 20:
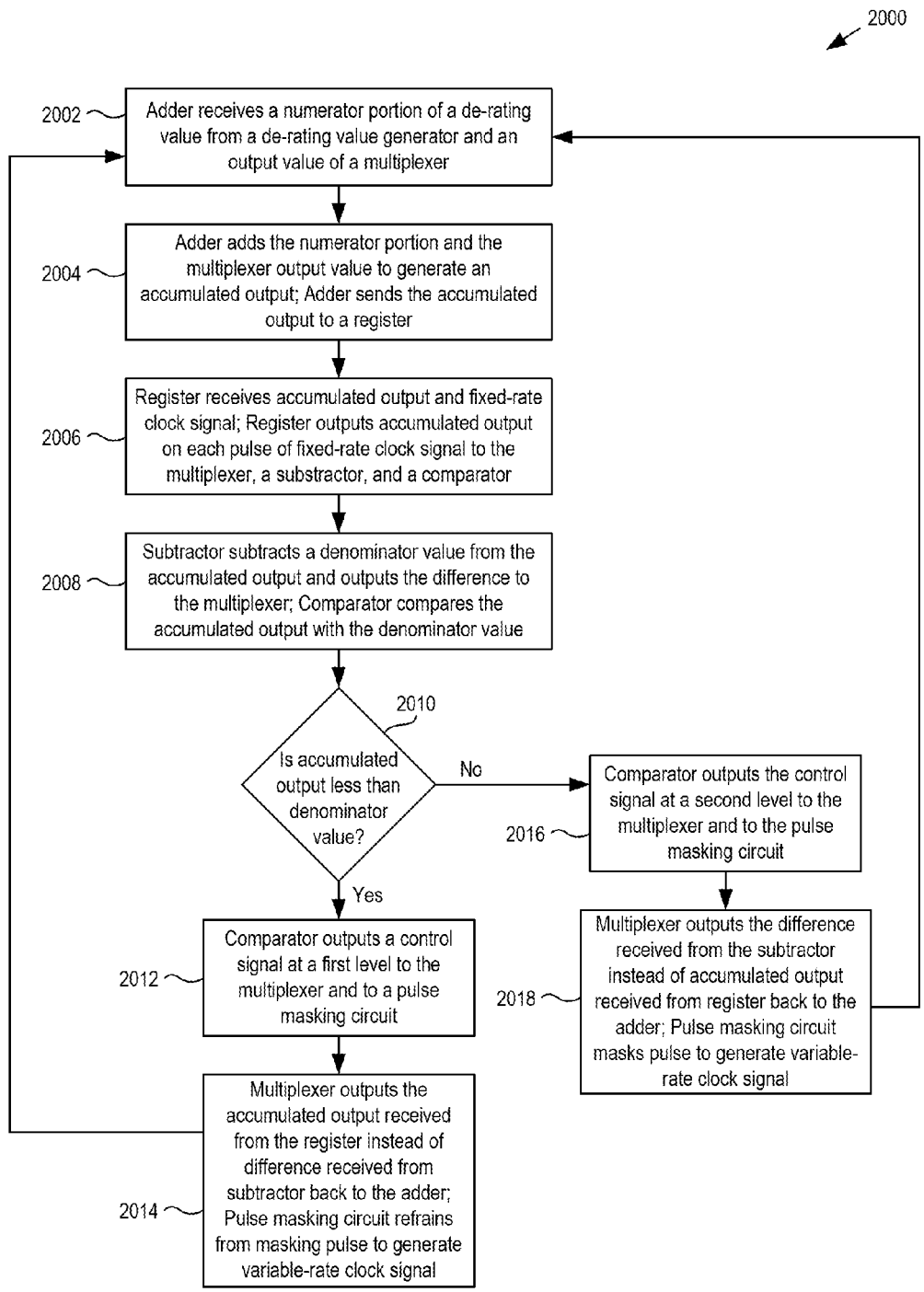
FIG. 20 is a flow chart of an example method of generating a variable-rate clock signal.

FIG. 20 is a flow chart of an example method 2000 of generating a variable-rate clock signal. At block 2002, an adder circuit may receive, at a first input, a numerator portion of a de-rating value from a de-rating value generator. The numerator portion of the de-rating value may indicate a numerator of a fraction of a rate of the fixed-rate clock signal at which the variable-rate clock signal is to be generated. Also at block 2002, the adder circuit may receive, at a second input, an output value of a multiplexer circuit. At block 2004, the adder circuit may add the de-rating value with the multiplexer output value to generate an accumulated output and send the accumulated output to a register.

At block 2006, the register may receive the accumulated output and the fixed-rate clock signal, and output the accumulated output on each pulse of the fixed-rate clock signal. The register may output the accumulated output to a first input of the multiplexer, a first input of a subtractor circuit, and a first input of a comparator circuit. At block 2008, the subtractor circuit may subtract a denominator value of the fraction from the accumulated output and output the difference to a second input of the multiplexer. Additionally, at block 2008, the comparator circuit may compare the accumulated output with the denominator value.

At block 2010, if the accumulated output is less than the denominator value, then at block 2012, the comparator circuit may output a control signal at a first level to the multiplexer and to a pulse masking circuit. At block 2014, in response to the control signal being at the first level, the multiplexer may output the accumulated output received from the register instead of the difference received from the subtractor circuit as its output value. The multiplexer may send the output value back to the second input of the adder circuit. Additionally, at block 2014, in response to the control signal being at the first level, the pulse masking circuit may refrain from masking a next pulse of the fixed-rate clock signal it is receiving and allow the pulse to pass to its output to generate and output the variable-rate clock signal. The method 2000 may then proceed back to block 2002, where the adder circuit receives the numerator portion of the de-rating value at the first input and the multiplexer output value at the second input.

Referring back to block 2010, if the accumulated output is greater than or equal the denominator value, then at block 2016, the comparator circuit may output the control signal at a second level to the multiplexer and to the pulse masking circuit. At block 2018, in response to the control signal being at the second level, the multiplexer may output the difference received from the subtractor circuit instead of the accumulated output received from the register as its output value. The multiplexer may send the output value back to the second input of the adder circuit. Additionally, at block 2018, in response to the control signal being at the second level, the pulse masking circuit may mask a next pulse of the fixed-rate clock signal it is receiving to generate and output the variable-rate clock signal. The method 2000 may then proceed back to block 2002, where the adder circuit receives the numerator portion of the de-rating value at the first input and the multiplexer output value at the second input.

Blocks 2002-2018 of the example method 2000 may continuously be performed over multiple cycles of the fixed-rate clock signal to generate pulses of the variable-rate clock signal by either masking or not masking pulses of the fixed-rate clock signal. Over the multiple cycles of the fixed-rate clock signal, the comparator circuit may output the control signal at the first and second levels to mask and not mask pulses of the fixed-rate clock signal at a rate corresponding to the fraction of the rate of the fixed-rate clock signal indicated by the de-rating value.

Figure 21:
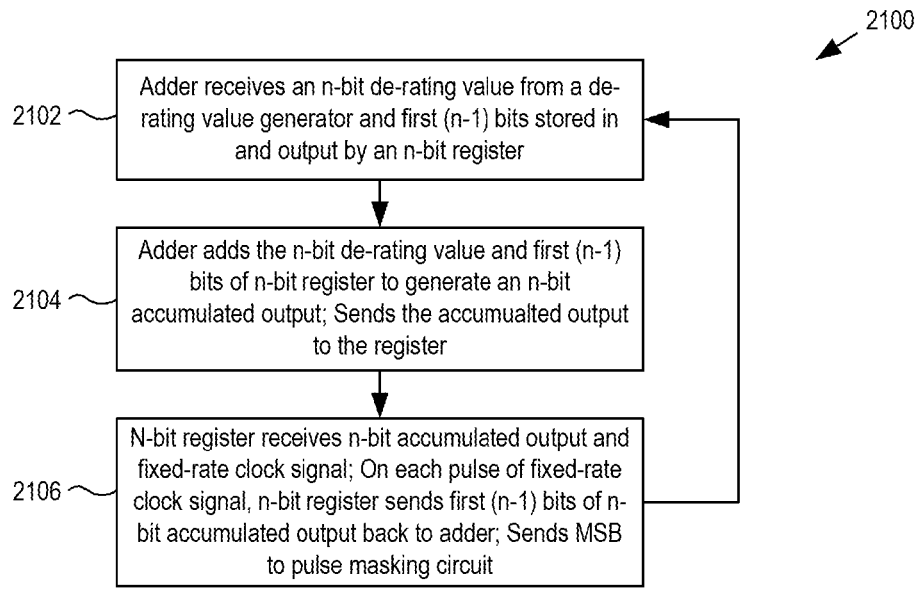
FIG. 21 is a flow chart of another example method of generating a variable-rate clock signal.

FIG. 21 is a flow chart of another example method 2100 of generating a variable-rate clock signal. At block 2102, an adder circuit may receive, at a first input, an n-bit de-rating value from a de-rating value generator. The n-bit de-rating value may indicate a fraction of a rate of a fixed-rate clock signal at which the variable-rate clock signal is to be generated. Also at block 2102, the adder circuit may receive, at a second input, a first output value of an n-bit register. The output value may be the (n−1) least significant bits stored in the n-bit register. At block 2104, the adder circuit may add the n-bit de-rating value with the first output value of the register to generate an n-bit accumulated output value and send the n-bit accumulated output value to the register.

At block 2106, the n-bit register may receive the n-bit accumulated output value and the fixed-rate clock signal. On each pulse of the fixed-rate clock signal, the n-bit register may store the n-bit accumulated output value, send the first output value comprising the (n−1) least significant bits of the n-bit accumulated output value back to the second input of the adder circuit, and output the most significant bit of the n-bit accumulated output value as a control signal to a pulse masking circuit. When the pulse masking circuit receives the control signal (i.e., the most significant bit) at a low (e.g., logic 0) level, the pulse masking circuit may refrain from masking a next pulse of the fixed-rate clock signal it is receiving and allow the pulse to pass to its output to generate and output the variable-rate clock signal. Alternatively, when the pulse masking circuit receives the control signal a high (e.g., logic 1) level, the pulse masking circuit may mask a next pulse of the fixed-rate clock signal it is receiving to generate and output the variable-rate clock signal. The method 2000 may then proceed back to block 2102, where the adder circuit receives the n-bit de-rating value at the first input and the (n−1) least significant bits of the n-bit accumulated output value output by the register at the second input.

Blocks 2102-2106 of the example method 2100 may continuously be performed over multiple cycles of the fixed-rate clock signal to generate pulses of the variable-rate clock signal by either masking or not masking pulses of the fixed-rate clock signal. Over the multiple cycles of the fixed-rate clock signal, the register may output the control signal comprising the most significant bit of the n-bit value at the high and low levels to mask and not mask pulses of the fixed-rate clock signal at a rate corresponding to the fraction of the rate of the fixed-rate clock signal indicated by the de-rating value.

Figure 22:
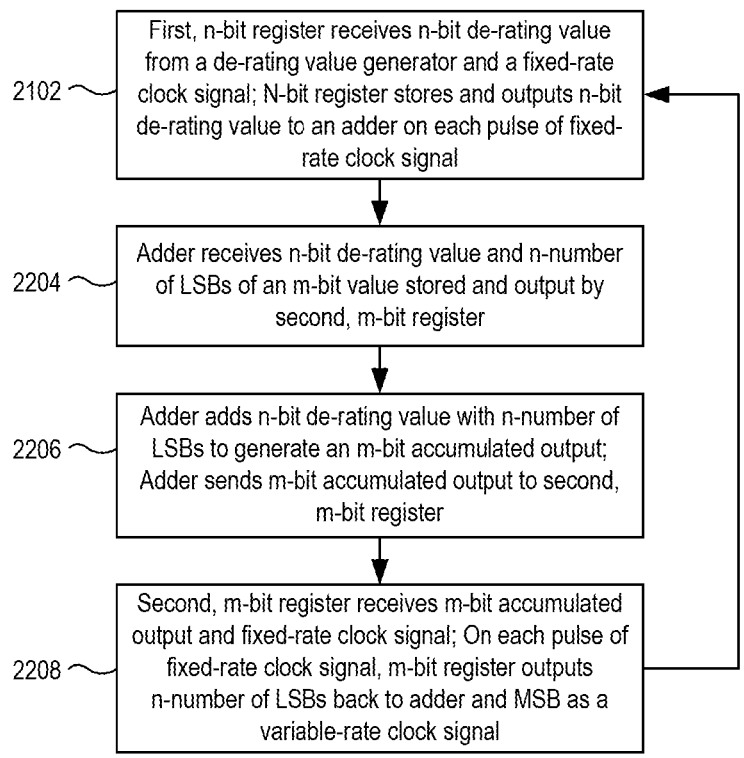
FIG. 22 is a flow chart of a third example method of generating a variable-rate clock signal.

FIG. 22 is a flow chart of another example method 2200 of generating a variable-rate clock signal. At block 2202, a first register, which may be an n-bit register, may receive an n-bit de-rating value from a de-rating value generator. The n-bit de-rating value may indicate a numerator value of a fraction of a rate of a fixed-rate clock signal at which the variable-rate clock signal is to be generated. Also at block 2202, the n-bit register may receive the fixed-rate clock signal. On each pulse of the fixed-rate clock signal, the n-bit register may store and output the n-bit de-rating value to a first input of an adder circuit.

At block 2204, the adder circuit may receive at the first input the n-bit de-rating value from the n-bit register and receive, at a second input, an n-number of least significant bits of an m-bit output value of a second register, which may be an m-bit register. The number m for the m-bit register may determine the denominator value of the fraction of the rate of the fixed-rate clock signal. At block 2206, the adder circuit may add the n-bit de-rating value with the n-number of least significant bits output from the second, m-bit register to generate an m-bit accumulated output value and send the m-bit accumulated output value to the second, m-bit register.

At block 2208, the second, m-bit register may receive the m-bit accumulated output from the adder circuit and the fixed-rate clock signal. On each pulse of the fixed-rate clock signal, the second, m-bit register may store the m-bit accumulated output value and output the m-bit accumulated output value as a first output comprising the n-number of least significant bits, and a second output comprising the most significant bit of the m-bit accumulated output value. The first output comprising the n-number of least significant bits may be sent back to the second input of the adder. The second output may be the variable-rate clock signal. The method 2200 may then proceed back to block 2202 where the first, n-bit register receives the n-bit de-rating value and output the de-rating value on a next pulse of the fixed-rate clock signal.

Blocks 2202-2208 of the example method 2200 may continuously be performed over multiple cycles of the fixed-rate clock signal to generate pulses of the variable-rate clock signal by outputting the most significant bit of the m-bit register at high (logic 1) and low (logic 0) levels. Over the multiple cycles of the fixed-rate clock signal, the rate at which the m-bit register outputs the most significant bit at the high and low levels may correspond to the fraction indicated by the n-bit de-rating value and the m-number of bits of the m-bit register.

Figure 23:
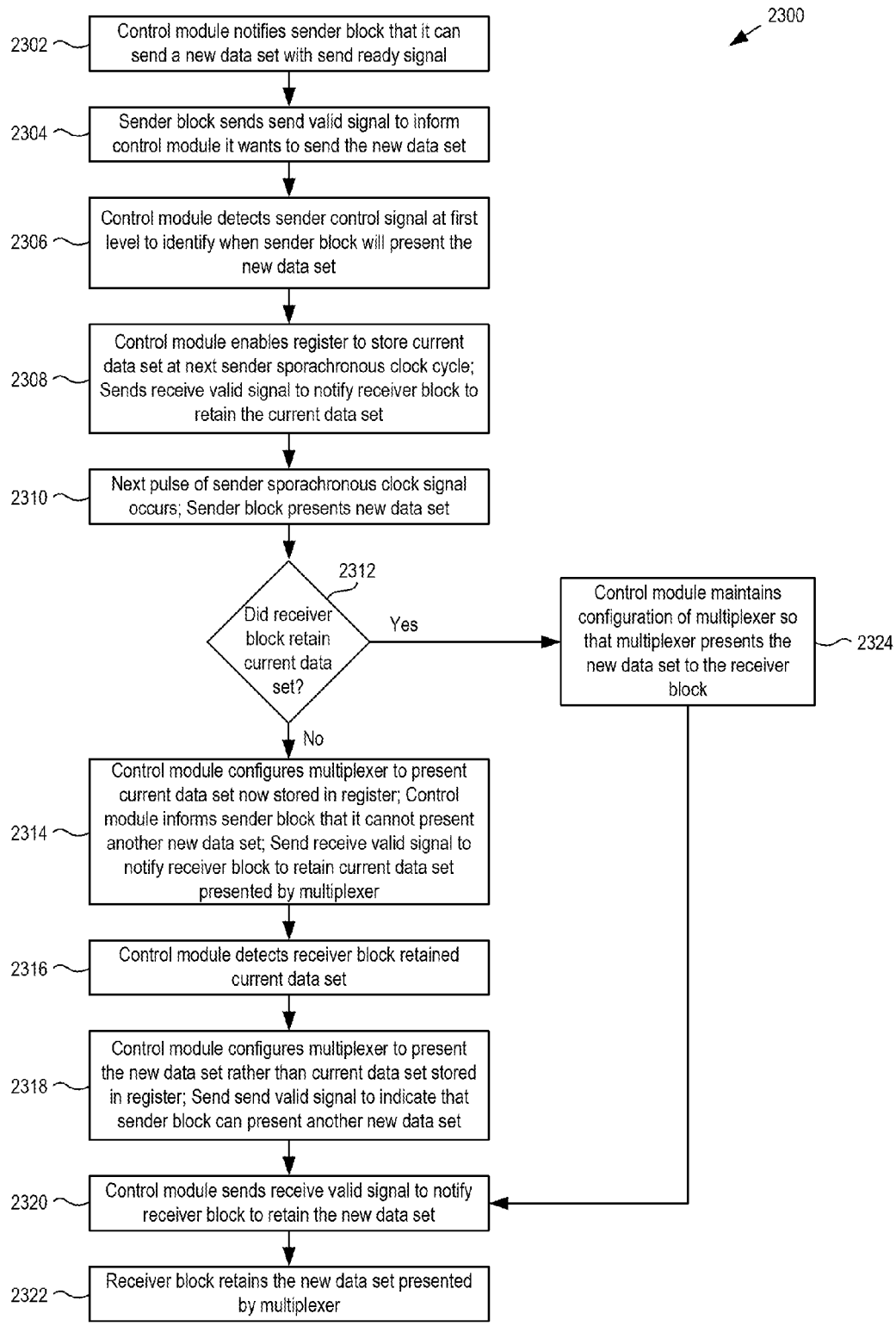
FIG. 23 is a flow chart of an example method of communicating a new data set from a sender processing circuit block of a pipeline to a receiver processing circuit block of the pipeline outside of a main data flow of the pipeline.

FIG. 23 is a flow chart of an example method 2300 of communicating a new data set from a sender processing circuit block of a pipeline to a receiver processing circuit block of the pipeline outside of a main data flow of the pipeline. The sender and receiver processing circuit blocks may be operating in different sporachronous clock domains, and the new data set may be communicated through a sporachronous synthesizer in order to be communicated from the sender processing block to the receiver processing circuit block. In this context, the sender processing circuit block may present the new data set to the sporachronous synchronizer and the sporachronous synchronizer may present the new data set to the receiver processing circuit block.

The sender processing circuit block may operate in a sender sporachronous clock domain and receive a sender sporachronous clock signal to operate. The receiver processing circuit block may operate in a receiver sporachronous clock signal and receive a receiver sporachronous clock signal to operate. Each of the sender and receiver sporachronous clock signals may be generated by a masking process in which pulses of a fixed-rate clock signal are masked by pulse masking circuitry. The pulse masking circuitry may receive a sender control signal generated by masking control signal generation circuitry to determine which pulses of the fixed-rate clock signal to mask to generate the sender sporachronous clock signal, and receive a receiver control signal generated by the masking control signal generation circuitry to determine which pulses of the fixed-rate clock signal to mask to generate the receiver sporachronous clock signal. If the sender control signal is at a first level, the pulse masking circuitry may pass a next received pulse of the fixed-rate clock signal to a first output to generate and output the sender sporachronous clock signal, and if the sender control signal is at a second level, the pulse masking circuitry may mask the next received pulse of the fixed-rate clock signal and pass the masked pulse to the first output to generate and output the sender sporachronous clock signal. Similarly, if the receiver control signal is at a first level, the pulse masking circuitry may pass a next received pulse of the fixed-rate clock signal to a second output to generate and output the receiver sporachronous clock signal, and if the sender control signal is at a second level, the pulse masking circuitry may mask the next received pulse of the fixed-rate clock signal and pass the masked pulse to the second output to generate and output the receiver sporachronous clock signal.

At block 2302, a control module of the sporachronous synchronizer may notify the sender processing circuit block via a send ready signal whether the sender processing circuit block can present the new data set to the sporachronous synchronizer. The control module may notify the sender processing circuit block via the send ready signal that it cannot present the new data set if the receiver processing circuit block has not yet accepted a previous data set that the sender processing circuit block previously presented and that a register of the sporachronous synchronizer is currently storing. If the receiver processing circuit block has not yet retained the previous data set, then the control module may configure the multiplexer of the sporachronous synchronizer to present to the receiver processing circuit block the previous data set being stored in the register rather than a current data set currently being presented by the sender processing circuit block. If the receiver processing circuit block has accepted the previous data set, then the multiplexer may be presenting the current data set to the receiver processing circuit block, and the control module may notify the sender processing circuit block that it can present the new data set.

At block 2304, the sender processing circuit block, presenting the current data set, may determine it wants to send the new data set to the receiver processing circuit block. The sender processing circuit block may check the level of the send ready signal it is receiving, and if the level indicates that the sender processing circuit block can present the new data set, then the sender processing circuit block may send a send valid signal, such as by setting the send valid signal to a high level, to the control module to indicate that the sender processing circuit block has the new data set to send.

At block 2306, the control module may detect the sender control signal at a first level from the masking control signal generation circuitry. In response to detecting that the send valid signal indicates that the sender processing circuit block has the new data set to send and that the sender control signal is at the first level, the control module may identify that the sender processing circuit block will present the new data set on the next pulse of the fixed-rate clock signal, which coincides with the next pulse of the fixed-rate clock signal.

At block 2308, in response to the identification, the control module may output a register enable signal, such as by setting the register enable signal to a high level, to the register of the sporachronous synchronizer to cause the register to store the current data set on the next pulse of the sender sporachronous clock signal. Also, at block 2308, in response to the identification, the control module may send a receive valid signal to the receiver processing circuit block to qualify the current data set that the multiplexer is presenting as a data set that the receiver processing circuit block has not yet retained and that it should retain when it is able to.

At block 2310, the next pulse of the fixed-rate clock signal, which coincides with the next pulse of the sender sporachronous clock signal, may occur. In response, the sender processing circuit block may begin presenting the new data set to the sporachronous synchronizer, and the register may begin storing the current data set.

At block 2312, the control module may determine if the receiver processing circuit block retained the current data set at the time that the sender processing circuit block began presenting the new data set. During at least one fixed-rate clock cycle prior to the time that the sender processing circuit block began presenting the new data set, the multiplexer may be presenting the current data set to the receiver processing circuit block, and the control module may send the receive valid signal to the receiver processing circuit block to qualify the current data set that the multiplexer is presenting as a data set that the receiver processing circuit block has not yet retained and that it should retain when it is able to. Additionally, the receiver processing circuit block may send a receive ready signal to the control module to indicate whether it is able to retain another data set. If, at a time that the control module is sending the receive valid signal to notify the receiver processing circuit to retain the current data set, the control module detects, from the receive ready signal, that the control module is able to retain the current data set and further detects the receiver control signal at the first level, the control module may determine at that time that the receiver processing circuit block will retain the current data set on the next pulse of the fixed-rate clock signal, which will coincide with the next pulse of the receiver sporachronous clock signal. If the control module makes this determination during a time period from when the sender processing circuit block began presenting the current data set to when the sender processing circuit block begins presenting the new data set, the control module may determine that the receiver processing circuit block retained the current data set at the time that the sender processing circuit block begins presenting the new data set.

If the control module determines that the receiver processing circuit block did not retain the current data set at the time that the sender processing circuit block started presenting the new data set, then at block 2314, the control module may configure the multiplexer to present the current data set, which is now being stored in the register, rather than the new data set that the sender processing circuit block is now presenting. Additionally, at block 2314, the control module may send the send ready signal to the sender processing circuit block to notify the sender processing circuit block that it cannot present a new data set. Also, the control module may set receive valid signal to indicate that the receiver processing circuit block should retain the current data set being presented by the multiplexer if the receive valid signal is not already set to that level.

At block 2316, the control module may detect, based on the receive valid signal, receive ready signal, and receiver control signal, that the receiver processing circuit block has retained the current data set. At block 2318, in response to the detection, the control module may configure the multiplexer to present the new data set being presented by the sender processing circuit block rather than the current data set stored in the register. Additionally, at block 2318, the control module may send the send valid signal to indicate that sender processing circuit block can present another new data set.

At block 2320, the control module may send the receive valid signal to notify the receiver processing circuit block that it should retain the new data set being presented by the multiplexer. In some example methods, the control module may look to the level of the sender control signal to determine whether to notify the receiver processing circuit block. When the control module configures the multiplexer to present the new data set, if the sender control signal is at the second level, then the control module may send the receive valid signal at a level that does not indicate to the receiver processing circuit block to retain the new data set being presented by the multiplexer. The control module may then wait until the sender control signal transitions to the first level, and then send the receive valid signal to notify the receiver processing circuit block to retain the new data set. Alternatively, if the sender control signal is already at the first level when the control module configures the multiplexer to present the new data set, then the control module may send the receive valid signal at a level to notify the receiver processing circuit block to retain the new data set.

At block 2322, the receiver processing circuit block may detect that the receive valid signal indicates that it should retain the new data set being presented by the multiplexer, determine that it is able to retain the new data, and then retain the new data set on the next pulse of the sporachronous clock signal.

Referring back to block 2312, if the control module determines that the receiver processing circuit block did retain the current data set at the time that the sender processing circuit block began presenting the new data set, then at block 2324, the control module may maintain the configuration of the multiplexer so that the multiplexer presents the new data set to the receiver processing circuit block. The method 2300 may then proceed to block 2320 where the control module sends the receive valid signal to notify the receiver block that it should retain the new data set being presented by the multiplexer.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another. In sum, although the present invention has been described in considerable detail with reference to certain embodiments thereof, other versions are possible. Therefore, the spirit and scope of the appended claims should not be limited to the description of the embodiments contained herein.

I claim:

1. A system comprising:
 a first processing circuit block configured to communicate data to a second processing circuit block outside of a main data flow of a pipeline by way of a synchronizer circuit;
 clock generation circuitry configured to:
  generate a first control signal to mask first pulses of a common clock signal to generate a first masked clock signal for operation of the first processing circuit block; and
  generate a second control signal to mask second pulses of the common clock signal to generate a second masked clock signal for operation of the second processing circuit block; and
 wherein the synchronizer circuit is configured to:
  receive the first control signal and the second control signal; and
  enable the communication of the data between the first processing circuit block and the second processing circuit block in response to receipt of the first control signal and the second control signal.

2. The system of claim 1, wherein the synchronizer circuit is further configured to:
 receive the common clock signal; and
 detect a pulse of the common clock signal corresponding to when the first processing circuit block is to begin presenting the data to the synchronizer circuit based on the first control signal.

3. The system of claim 2, wherein the data comprises a current data set and a next data set, the first processing circuit block configured to present the next data set after presenting the current data set to the synchronizer ciruit, and wherein the synchronizer circuit comprises a register configured to store the current data set when the first processing circuit block begins presenting the next data set.

4. The system of claim 3, wherein the register is configured to receive the first masked clock signal from the clock generation circuitry, and
 wherein the synchronizer circuit comprises a controller configured to send a register enable signal to the register in response to detection of the pulse of the common clock signal corresponding to when the first processing circuit block is to begin presenting the next data set, wherein the register enable signal causes the register to store the current data set on a next pulse of the first masked signal.

5. The system of claim 3, further comprising a multiplexer configured to present the data to the second processing circuit block,
 wherein the controller is further configured to:
  when the first processing circuit block begins presenting the next data set:
   configure the multiplexer to present the next data set to the second processing circuit block instead of the current data set stored in the register if the second processing circuit block has retained the current data set; and configure to multiplexer to present the current data set stored in the register instead of the next data set that the first processing circuit block is presenting if the second processing circuit block has not retained the current data set.

6. The system of claim 5, wherein the controller is further configured to:

detect whether the second processing circuit retained a prior data set that the first processing circuit block presented prior to presenting the current data set; and send a send ready signal to the first processing circuit block to indicate that the first processing circuit block can present the next data set upon detection of the second processing circuit block having retaining the prior data set.

7. The system of claim 5, wherein the controller is configured to detect whether the second processing circuit has retained the current data set based on the second control signal.

8. The system of claim 7, wherein the controller is configured to detect a pulse of the common clock signal corresponding to when the second processing circuit block retains the current data set based on the second control signal.

9. The system of claim 7, wherein the controller is configured to send a receive valid signal to the second processing circuit block to notify the second processing circuit block to retain the current data set if the controller detects that the second processing circuit block has not retained the current data set, and:

when the controller detects the pulse of the common clock signal corresponding to when the first processing circuit block is to begin presenting the next data set, or when the multiplexer is configured to present the current data set stored in the register.

10. The system of claim 1, wherein the common clock signal comprises a fixed-rate clock signal.

11. The system of claim 1, wherein the clock generation circuitry is configured to generate the first control signal to mask the first pulses according to a first fraction of a rate of the common clock signal, and generate the second control signal to mask the second pulses according to a second masking rate corresponding to a second fraction of the rate of the common clock signal.

12. A method comprising:

presenting, with a synchronizer circuit configured outside a main data flow of a pipeline, a current data set received from a first processing circuit block to a second processing circuit block;

receiving, with the synchronizer circuit, a control signal transitioning between a high level and a low level according to a masking rate at which pulses of a common clock signal are masked to generate a masked clock signal that is sent to the first processing circuit block of the pipeline; and sending, with the synchronizer circuit, a receive valid signal to the second processing circuit block to notify the second processing circuit block to retain the current data set that the synchronizer circuit is presenting based on the control signal.

13. The method of claim 12, further comprising:

receiving, with the synchronizer circuit, the common clock signal; and detecting, with the synchronizer circuit, a pulse of the common clock signal corresponding to when the first processing circuit block is to begin presenting a next data set based on the control signal.

14. The method of claim 13, further comprising:

storing, with a register of the synchronizer circuit, the current data set when the first processing circuit block begins presenting the next data set.

15. The method of claim 14, further comprising:

receiving, with the register, the masked clock signal; and receiving, with the register, a register enable signal when a controller of the synchronizer circuit detects the pulse of the common clock signal corresponding to when the first processing circuit block is to begin presenting the next data set, wherein storing the current data set comprises storing, with the register, the current data set on a next pulse of the masked signal in response to receiving the register enable signal.

16. The method of claim 14, further comprising:

when the first processing circuit block begins presenting the next data set:

presenting, with a multiplexer of the synchronizer circuit, the next data set to the second processing circuit block instead of a current data set stored in the register if the second processing circuit block has retained the current data set; and presenting, with the multiplexer, the current data set stored in the register instead of the next data set that the first processing circuit block is presenting if the second processing circuit block has not retained the current data set.

17. The method of claim 16, further comprising:

detecting, with the synchronizer circuit, whether the second processing circuit block retained a prior data set that the first processing circuit block presented prior to presenting the current data set; and sending, with the synchronizer circuit, a send ready signal to the first processing circuit block to indicate that the first processing circuit block can present the next data set upon detecting that the second processing circuit block retained the prior data set.

18. The method of claim 16, wherein the control signal comprises a first control signal, the method further comprising:

detecting, with the synchronizer circuit, whether the second processing circuit block has retained the current data set based on a second control signal transitioning between the high level and the low level according to a second masking rate at which second pulses of the common clock signal are masked; and when detecting that the second processing circuit block has not retained the current data set, sending, with the synchronizer circuit, the receive valid signal to the second processing circuit block to notify the second processing circuit block to retain the current data set when the register is storing the current data set and the multiplexer is presenting the current data set stored in the register instead of the next data set that the first processing circuit block is presenting.

19. A circuit comprising:

a multiplexer configured to present a current data set received from a first processing circuit block outside of a main data flow of a pipeline to a second processing circuit before presenting a next data set to the second processing circuit block;

a controller configured to:
  receive a control signal that transitions between a high level and a low level according to a masking rate at which pulses of a common clock signal are masked for generation of a masked clock signal that is sent to the first processing circuit block; and
  send a receive valid signal to the second processing circuit block to notify the second processing circuit block to retain the current data set that the multiplexer is presenting based on the control signal.

20. The circuit of claim 19, wherein controller is further configured to:
  receive the common clock signal; and
  detect a pulse of the common clock signal corresponding to when the first processing circuit block is to begin presenting the next data set based on the control signal.

21. The circuit of claim 20, further comprising:
  a register configured to store the current data set when the first processing circuit block begins presenting the next data set.

22. The circuit of claim 21, wherein the register is configured to receive the masked clock signal, and
  wherein the controller is further configured to send a register enable signal to the register in response to detection of the pulse of the common clock signal corresponding to when the first processing circuit block is to begin presenting the next data set, wherein the register enable signal causes the register to store the current data set on a next pulse of the masked signal.

23. The circuit of claim 21, wherein the controller is further configured to:
  when the first processing circuit block begins presenting the next data set:
    configure the multiplexer to present the next data set to the second processing circuit block instead of the current data set stored in the register if the second processing circuit block has retained the current data set; and
    configure to multiplexer to present the current data set stored in the register instead of the next data set that the first processing circuit block is presenting if the second processing circuit block has not retained the current data set.

24. The circuit of claim 23, wherein the controller is further configured to:
  detect whether the second processing circuit retained a prior data set that the first processing circuit block presented prior to presenting the current data set; and
  send a send ready signal to the first processing circuit block to indicate that the first processing circuit block can present the next data set upon detection of the second processing circuit block having retaining the prior data set.

25. The circuit of claim 23, wherein the controller is further configured to:
  detect whether the second processing circuit block has retained the current data set based on the second control signal; and
  when detecting that the second processing circuit block has not retained the current data set, and when the register is storing the current data set and the multiplexer is presenting the current data set stored in the register instead of the next data set that the first processing circuit block is presenting, send the receive valid signal to the second processing circuit block to notify the second processing circuit block to retain the current data set.

* * * * *